(12) United States Patent
Pitsos

(10) Patent No.: US 10,248,721 B2
(45) Date of Patent: Apr. 2, 2019

(54) MANAGEMENT, EVALUATION AND VISUALIZATION METHOD, SYSTEM AND USER INTERFACE FOR DISCUSSIONS AND ASSERTIONS

(71) Applicant: Errikos Pitsos, Malans (CH)

(72) Inventor: Errikos Pitsos, Malans (CH)

( * ) Notice: Subject to any disclaimer, the term of this patent is extended or adjusted under 35 U.S.C. 154(b) by 121 days.

(21) Appl. No.: 14/173,645

(22) Filed: Feb. 5, 2014

(65) Prior Publication Data
US 2015/0220580 A1 Aug. 6, 2015

(51) Int. Cl.
*G06F 17/30* (2006.01)
*G06F 17/27* (2006.01)
*G06Q 50/00* (2012.01)

(52) U.S. Cl.
CPC ...... *G06F 17/30731* (2013.01); *G06F 17/279* (2013.01); *G06F 17/2785* (2013.01); *G06F 17/30705* (2013.01); *G06Q 50/01* (2013.01)

(58) Field of Classification Search
CPC ............................ G06F 17/279; G06F 17/2785
See application file for complete search history.

(56) References Cited

U.S. PATENT DOCUMENTS

| | | | | |
|---|---|---|---|---|
| 6,154,764 A * | 11/2000 | Nitta | ...................... | G06Q 10/107 |
| | | | | 379/202.01 |
| 6,665,688 B1 * | 12/2003 | Callahan, II | ...... | G06F 17/30353 |
| 7,233,975 B1 * | 6/2007 | Gerraty | ................... | H04L 45/02 |
| | | | | 707/999.008 |
| 7,634,546 B1 * | 12/2009 | Strickholm | ............ | G06Q 10/10 |
| | | | | 709/205 |
| 8,903,921 B1 * | 12/2014 | Snow | ...................... | H04L 51/16 |
| | | | | 709/204 |
| 2004/0117449 A1 * | 6/2004 | Newman | ........... | G06F 17/30595 |
| | | | | 709/206 |
| 2004/0210582 A1 * | 10/2004 | Chatterjee | ......... | G06F 17/30575 |
| 2006/0242185 A1 * | 10/2006 | Paulus | .............. | G06F 17/30861 |
| 2007/0055610 A1 * | 3/2007 | Palestrant | .............. | G06Q 10/06 |
| | | | | 705/37 |
| 2008/0222261 A1 * | 9/2008 | Razdow | .................. | H04L 51/18 |
| | | | | 709/206 |
| 2010/0205168 A1 * | 8/2010 | Yang | ................. | G06F 17/30864 |
| | | | | 707/709 |
| 2012/0016661 A1 * | 1/2012 | Pinkas | ................ | G06F 17/2785 |
| | | | | 704/9 |
| 2012/0042020 A1 * | 2/2012 | Kolari | .................. | G06Q 10/107 |
| | | | | 709/206 |
| 2012/0239886 A1 * | 9/2012 | Rantanen | .......... | G06F 17/30578 |
| | | | | 711/147 |

(Continued)

*Primary Examiner* — Robert W Beausoliel, Jr.
*Assistant Examiner* — Nirav K Khakhar
(74) *Attorney, Agent, or Firm* — Perkins Coie LLP

(57) ABSTRACT

Various embodiments described herein relate to methods, systems, apparatus and computer-readable media for providing a graphical representation of a plurality of statements in a tree-like structure. At least a portion of the statements is displayed on a screen. Each displayed statement comprises a contents portion and an assigned classification. The statements further have one or more associated quality designations. According to one embodiment, the assigned classification is selected from a set of at least two classifications. Each classification specifies a relationship of an associated statement to another statement in said tree-like structure.

18 Claims, 20 Drawing Sheets

(56) References Cited

U.S. PATENT DOCUMENTS

| | | | |
|---|---|---|---|
| 2012/0317046 A1* | 12/2012 | Myslinski | G06Q 30/02 705/329 |
| 2013/0218788 A1* | 8/2013 | Terheggen | G06Q 30/018 705/317 |
| 2013/0254290 A1* | 9/2013 | Grossman | H04L 67/306 709/204 |
| 2014/0026042 A1* | 1/2014 | Taudes | G06Q 10/101 715/256 |
| 2014/0278835 A1* | 9/2014 | Moseson | G06Q 50/01 705/12 |
| 2015/0005060 A1* | 1/2015 | Shankar | G07F 17/329 463/26 |
| 2015/0006492 A1* | 1/2015 | Wexler | G06F 17/30864 707/694 |
| 2015/0229698 A1* | 8/2015 | Swan | H04L 67/42 709/203 |
| 2015/0254230 A1* | 9/2015 | Papadopoullos | G06F 17/275 704/8 |

* cited by examiner

MANAGEMENT, EVALUATION AND VISUALIZATION METHOD, SYSTEM AND USER INTERFACE FOR DISCUSSIONS AND ASSERTIONS

BACKGROUND OF THE INVENTION

Field of the Invention

The invention relates to the field of managing, evaluating and visualizing discussions and arguments or related data and, more particularly, to computer systems, computer-implemented methods and user interfaces for structuring, evaluating and relating assertions of one or more discussions.

Description of the Related Art

It has become very common and increasingly important that users or readers of publications in the internet, such as articles of online newspapers can post comments regarding a published article, paper or blog. Typically, internet publications such as articles or blogs provide a commenting or chatting option, in which registered or unregistered users can write comments entries. Typically, such comments entries are displayed next to or below the article in the order as created or posted by the users. It is also known that a user can write a comment entry in reply to an existing displayed entry. This may be visualized by a treelike structure showing that a comment entry has been entered in response to an existing one. This often leads to a very long list or tree of entries, which are typically listed in chronological order. Message boards or forums are often part of a website allowing a group of users to elaborate on various aspects of the website's topic.

In order to enhance readability it is typically possible that readers or editors can collapse an entry to thereby only show the top line or first few words of an entry, hide or emphasize entries. However, those existing commenting technologies have the disadvantage that it is very difficult and cumbersome to follow the discussion, as very often entries that are just personal opinions, nods of agreement, interesting side stories, will be injected and cannot be distinguished from the actual arguments of the discussion. It is very time consuming for readers to read comment trees. Additionally, typical forum software products allow only for linear entries, one entry after another, which leads to complex quoting of previous entries or parts of their contents. If multiple replies are added to a specific existing entry in a treelike structure, the purpose of an entry and its usefulness in the debate could be confusing for the reader. FIG. 1 illustrates exemplary a website 100 with a publication 110 like a newspaper article. The website offers a commenting function 120 allowing readers to add a comment, typically by selecting an input field 130 allowing the user to add or create a new comment. Shown in FIG. 1 are exemplary existing comments 140 to 145. In the illustrated example, the comments 140 to 144 are minimized or collapsed while comment 145 has been maximized showing its complete text 150. The expanded comment 145 also allows a reader to create a reply comment using input 160 and to collapse or minimize the comment using input button 170. The illustrated example shows a treelike structure of the comments in that comments 140, 141 and 145 are comments at the same highest level. Comments 142 and 143 however are comments in reply to comment 141. Comment 144 in turn has been added in reply to comment 143.

In known systems, such comments are typically displayed in their chronological order meaning that comment 145 was added after comments 141 and 140 were created. If there are many comments that have been added in reply to the same existing comment, it will be difficult for a reader to understand and easily recognize the purpose or relevance of the comments. A difficulty is to answer to two comments, for example comments 142 and 143. In this case, it is necessary to input the same comment twice, in reply to comment 142 and again in reply to comment 143. A new comment is either in reply to an existing comment or a new comment at the highest level of the illustrated tree structure.

There is a further a need in existing computer-implemented methods, user interfaces and systems that allow for an evaluation and moderation of a discussion. This applies to discussions between multiple participants, such as commenting systems or blogs. This, however, also applies to "discussions" representing a collection of pertinent arguments for a specific topic, such as pros and cons of a given issue. The latter can be used by just one user, or one group of users, to maintain pros and cons for a specific issue, topic, or task. It would further be desirable for a user to be able to understand whether or not a specific comment is at all important, and if so whether it supports or disproves other assertions of a discussion, in particular in distributed systems like the internet. At present, no solution has been proposed in this respect. If at all, individual comments in a "comments section" on a website can be ranked in that readers either select a "like" or "dislike" button that jointly determines whether the majority of readers likes or dislikes a specific comment. However, in such systems very often funny comments become the most emphasized comments, but not the most sincere and best researched arguments. The system is merely a majority voted system and the most popular comments often become the "best" comments even if the comment has little or no value to the point of discussion. The known like/dislike or +/− system for user voting only determine the most popular comments, which are often merely the most funny entries. It would also be desirable to have a system that allows distinguishing between what individual subgroups would "like" or even better, considering to being most relevant. No such system exists today.

SUMMARY OF THE INVENTION

The various embodiments described herein relate to methods, systems, apparatus and computer-readable media for providing a graphical representation of a plurality of statements in a tree-like structure. More particularly, one embodiment provides a computer-implemented method for providing a graphical representation of a plurality of statements in a tree-like structure. At least a portion of the statements is displayed on a screen. Each displayed statement comprises a contents portion and an assigned classification. The statements further have one or more associated quality designations. According to one embodiment, the assigned classification is selected from a set of at least two classifications. Each classification specifies a relationship of an associated statement to another statement in said tree-like structure.

In another embodiment, a system comprises a user interface for providing a graphical representation of a plurality of statements in a tree-like structure. The system displays at least a portion of the statements. Each statement comprises a contents portion and has an assigned classification. Moreover, each statements has one or more associated quality designations. The system or user selects the assigned classification from a set of at least two classifications that each specify a relationship of an associated statement to another statement in said tree-like structure.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following more particular description, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers. The terms assertion, argument and statement may be used interchangeable in the following specification of the embodiments of the invention, if not expressly stated otherwise.

Generally, the present invention provides for a computer-implemented method, system and user interface for managing, visualizing or evaluating assertions, related statements or entries. This may particularly be used in a system allowing multiple remote users to participate in a discussion, as a means to document, record and evaluate arguments of a discussion. The teachings of the present invention can further be used for maintaining pros and cons as well as comments for a specific issue, topic, or task, or for the purpose of reasoning and critical thinking by oneself.

In particular, according to some embodiments, assertions can be added to a discussion or an analysis and their importance and relation to other one or more assertions of the discussion can be specified and evaluated. An example of a possible discussion layout is given by FIG. 2, which may be displayed on a screen of a user device, such as a computer, smartphone, tablet, terminal or portable device. Different assertions, also referred to as entries or statements, are illustrated as nodes 210 to 215 of a treelike structure. The terms assertion, entry and node are used interchangeably unless stated differently. Likewise, the terms subnode and downnode are used interchangeably hereinafter. Assertions are a way of formulating an argument. Each node is a graphical representation of one assertion. This is exemplary illustrated as text element 220 for node 210.

Figure 1:
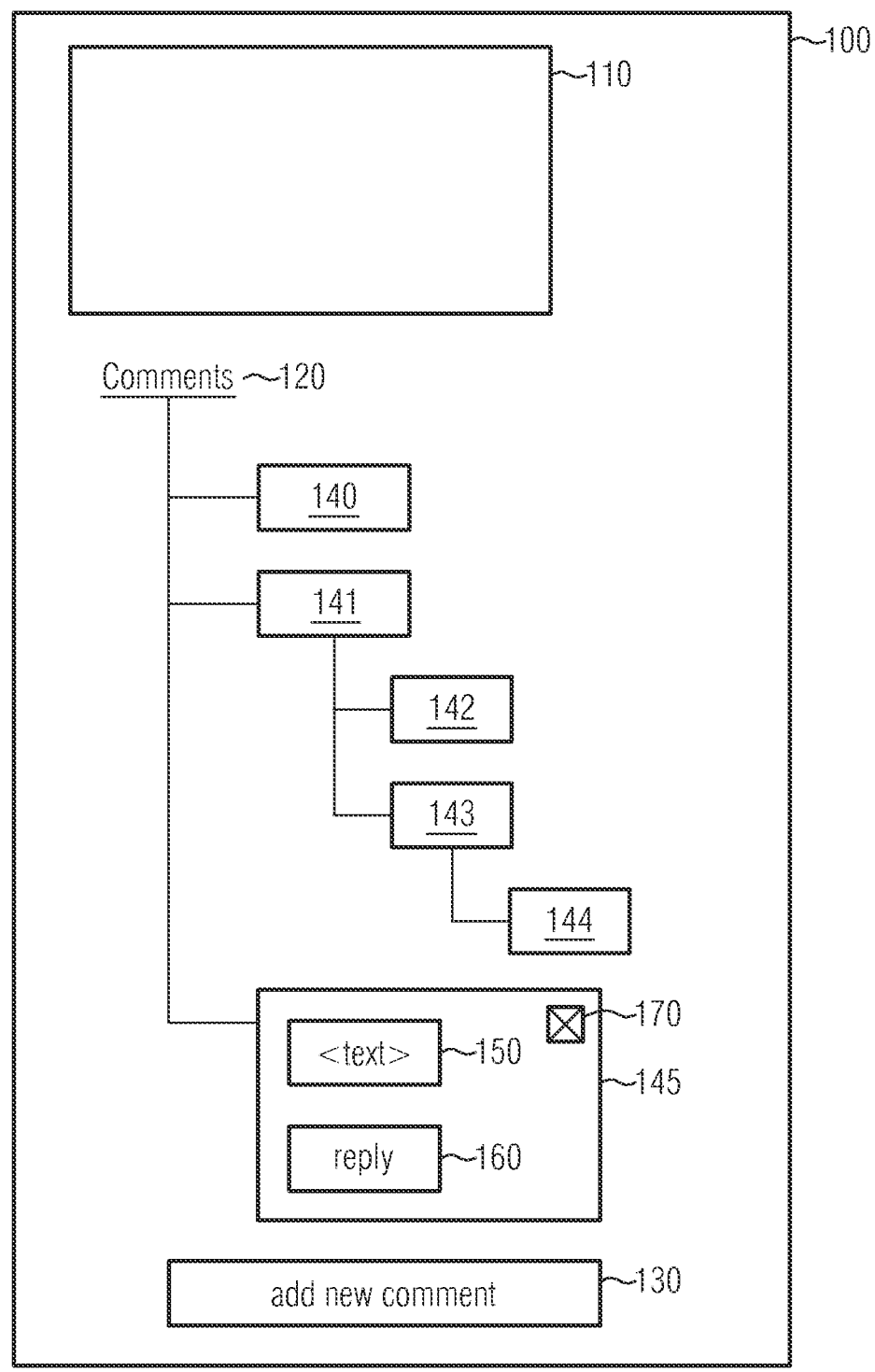
FIG. 1 is a schematic illustration of a website offering a commenting functionality according to the state of the art.
Figure 2:
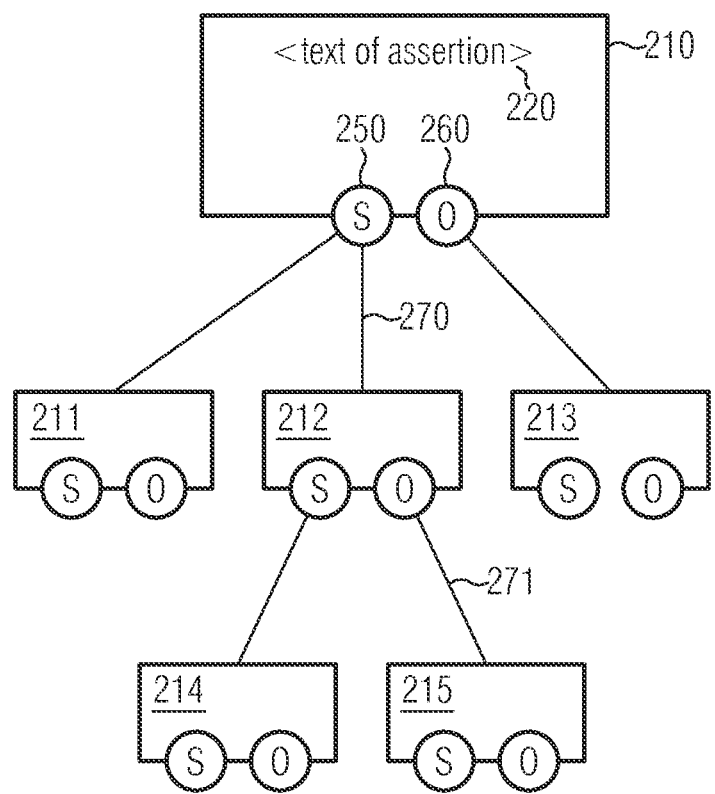
FIG. 2 is schematically illustrates five nodes in a tree-like structure according to embodiments of the present invention.

The top node 210 illustrated in FIG. 2 contains an assertion or a statement to which further nodes 211-213 with respective assertions can be added. These assertions are either supporting or opposing arguments of the assertion of node 210. In different embodiments, an assertion can also specify an alternative to another assertion. As an example, nodes 211 to 215 are displayed as representing either supporting arguments (nodes 211, 212 and 214, each connected to a port 250 labeled "S") or opposing arguments (nodes 213 and 215, each connected to a port 260 labeled "O"). Each node has a such a port or field 250, labeled for example "S", from which all downnodes with supporting arguments branch off and an opposing port or field 260, labeled "O", from which the downnodes with opposing arguments branch off. In further embodiments, nodes with supporting and opposing arguments can be illustrated differently, for example, using different symbols like "+" and "−" for supporting and opposing arguments respectively. In still further embodiments this may be achieved through different colors or shapes of the nodes or the branch lines between the nodes. For example, one color could illustrate a node with a supporting argument while another color could illustrate a node with an opposing argument for the immediately preceding upnode in the tree structure. From the example of FIG. 2, one can understand that new nodes can be added to each node that either support or oppose the assertion in question, meaning the assertion of the current node. The system is not limited to just supporting or opposing assertions. Different defined logical relations between assertions can also be defined and represented by suitable symbols or graphical representations of the nodes.

The following are rules and features that may be applied in various embodiments for defining and constructing the assertions and their respective nodes.

- A discussion and its individual assertions are represented by nodes. These nodes can be self-contained graphical representations of the assertions, like rectangular shapes or circles, as illustrated by node 210 in FIGS. 2 and 3.
- Each node contains text and/or different kinds of media such as embedded videos, pictures, tables, files or combinations thereof. This text or the media objects provide the arguments for the discussion, while the nodes can be used to illustrate their relevance, purpose, or importance to the discussion.

Some or all of the nodes can include designated areas at their graphically border, referred to as ports or connecting fields. Each of these ports of a node provides a different functionality. A supporting port is a connector to connect the node to another node having an assertion that supports the assertion of the present node. Likewise, an opposing port connects the current node with another node having an assertion that opposes the assertion of the present node. Different ports for connecting comments, evidence or other related entries can be defined. Links are used to connect the different nodes by linking two or more nodes using the respective ports. These links are graphically represented by lines, arrows or other suitable elements, as illustrated in FIG. 2 by lines 2170 and 271. A node that is currently focused or worked on the graphical user display is referred to as a centernode. The nodes branching off the support and opposing ports of the centernode are referred to as downnodes. In the example in FIG. 2, nodes 211 to 213 are the downnodes of a centernode 210. According to an embodiment of the invention, only the centernode shows the complete text or other media object 222, while the text or embedded media objects of the assertions of the remaining displayed nodes is either minimized or not displayed. If the centernode is not the top node or root in the tree structure, its assertion, i.e., the text or embedded object 222, is an argument that supports or opposes at least one other nodes' assertion. This other node is referred to as an upnode. Each node can have more than one upnode to which the assertion of the centernode is either an opposing or an opposing assertion. The system can automatically or manually choose a different layout for the centernode and the related upnodes and downnodes. The layout can show these nodes in an emphasized, complete, shortened or minimized style. The layout choice can also be controlled by aspects like relevance or defined qualities of the node or its nodes type of relation to another node.

One aspect of the invention is that each assertion/argument is its own node. Multiple arguments cannot be pooled or grouped into one node. This means that each argument can be addressed individually in that each argument can then be opposed or supported by further arguments using the proposed node structure. This avoids a user having to expressly state which of previously presented arguments are addressed by his new argument. Instead, the proposed structure of nodes with dedicated ports for linking supporting and opposing arguments in a structure of upnodes and downnodes immediately shows the purpose of an added argument. This provides that each argument can be individually rated, voted, reported, shared or linked to and accordingly be used in a different discussion. The tree structure of nodes and the complete discussion can also be referred to as a map. Different maps or some of its nodes with respective assertions can be linked together, as will be discussed in more detail below.

Each argument is formulated as one assertion, meaning a text and/or a media objects as noted above. According to embodiments of the inventions, the arguments have to be complete. For example, this means that individual assumptions or propositions that only together form an argument are not separately included in multiple nodes but are combined into one node to form a proper argument.

According to some embodiments, any questions, comments, funny anecdotes, personal opinions and rants are separated from these assertions of the nodes. They can be added as separate information to the nodes via special fields or ports, such as a commenting port illustrated below with regard to FIG. 3. For example, comments may be added to a node using a commenting port which is distinct from the supporting and opposing ports used to link further assertions to the node. A commenting functionality with a branch or tree of comments can be added to a node that is separate and distinct from the upnodes and downnodes that contain further assertions. The comments or comment tree be displayed only upon a user selecting a designated field, for example, through clicking or touching a button of the node.

A branch, according to the present invention may be referred to as a node and its downnodes or a subset of its downnodes.

Nodes can have parameters or qualities, like values designating the veracity and/or the relevance of a node. In other embodiments, different symbols can be used to designate such parameters or quantities.

A node's veracity value is a specific value within a predefined range of possible values. A minimum veracity value thereby has the meaning of a false assertion and a maximum veracity value has the meaning of a true assertion. The values in between are accordingly different levels of how true an assertion is. This may depend on a so-called Worldview parameter associated with the node or entire map, so that different veracity values may exist for a single node. The WorldView parameter is discussed in more detail below and has influence on other parameters of the node, including the veracity value associated with each node.

The links between the nodes of a map symbolize according to embodiments of the invention the relevance of a downnode to the respective node, to which the downnode is connected to via the respective port of the node. The relevance is a parameter or variable. The relevance value may be different for different WorldView settings. For example, the same downnode may have a higher relevance to the upnode according to one WorldView than it has according to a different WorldView. The relevance value may be symbolized through different graphical representations of the link, such as different colors, different thickness or a different decorative representation of the displayed connection. Alternatively, the relevance may also be indicated and specified through a variable ranging between a minimum and a maximum value, in the same manner as the veracity value(s) of a node. The same node can have high relevance when used as a supporting argument for a first upnode, while being less relevant or irrelevant when used as a supporting argument for another upnode. The same node can even be used as a supporting assertion for one upnode and as an opposing assertion for another upnode, each with different relevance values. The relevance values are therefore associated with a link of one node to its upnode. The veracity value is however associated with the assertion of the node itself and should be independent of its upnode, to which the assertion is used as a supporting or opposing argument. What has been discussed above in regard to the relevance values applies likewise to other qualities associated with the links between nodes. An example of such qualities is an approval value as will be discussed below.

The veracity of a node can depend on, or derived from, the veracity values and relevance values of some or all of its downnodes, as will be discussed in more detail below. The relevance value is associated with a link between a node X and its upnode Y. More specifically, the relevance value indicates to what degree the argument of node X, under the assumption to the argument of node X is true, changes the veracity value of its upnode Y. As an example, the highest relevance value is assigned if node X includes a mathematical deductive proof that proves that the assertion of upnode Y is either true or false. A further example is a current node X that has an assertion that logically proves that upnodes Y's assertion is logically inconsistent. In this case, the node X would be an opposing argument to upnode Y and the link between current node X and its upnode Y would have a high relevance. Again, the relevance of a node to its upnode is independent of whether or not the node's argument(s) is true. Assuming that the argument of the current node X (which is, in the above example, the logical proof of an inconsistent statement of the upnode Y) is indeed true (which means that node X has a high veracity value), causes the veracity value of upnode Y to be decreased to a small veracity value.

The veracity and relevance values or other qualities of nodes and its links to their upnodes can change based on different WorldView parameters associated with the nodes or node maps. By this the invention can take into account that different views or different user perspectives can have different opinions on whether a specific assertion is true or not and whether a certain argument is relevant to another argument and to what degree. Using the WorldView parameter of embodiments of the invention, a user perspective driven layout of the map and its multiple nodes can be generated and displayed based on the same set of arguments. It is also possible to determine and compare the impact of an assertion for specific user perspectives. This is achieved in that the respective veracity and relevance values that are assigned to the nodes and their links depend on a WorldView parameter. In one example, each node has multiple veracity values and each link has multiple relevance values; one for each WorldView parameter respectively. In a further embodiment, not only veracity, relevance and importance values but also the content, the argument, of a node may be different for different WorldView parameters.

The proposed node structure according to the invention is not limited to assertions of a discussion. If using the proposed system in a different way, like for example to analyze a marketing campaign, the veracity value could be the cost of an action and the relevance value could be the market impact of that action. As for veracity and relevance simple formulas can be used to automatically propagate these values through the upnodes.

The same node can be used as a supporting or an opposing argument in multiple for multiple upnodes, even in multiple locations of the node map. This can be implemented by multiple local representations or local copies of a node in a node map at the respective locations in the map tree. In other words, the node appears as a downnode of all those nodes it is connected to via the opposing or supporting ports. Alternatively, a single node representation can be linked to multiple upnodes through multiple links connecting the single node representation and its multiple upnodes. In this case, the links can be multi-dimensional such as 2-dimensional or 3-dimensional. It is also possible, according to further embodiments of the invention, to copy or link nodes or even entire branches of the node map. For example, an existing node X with an assertion in a map is found to be a relevant supporting or opposing argument for another assertion Y (in the same map or another map) for which the node X is currently not a downnode, meaning they are not linked to each other. The node X can then be copied or linked to the respective port of node Y. If the original node X has already downnodes branching off its respective supporting or opposing ports, these downnodes are also copied or linked along with copying node X. As noted above, veracity and relevance or other quality values may depend on a WorldView parameter. Upon linking a node or an entire branch of nodes from one map to another map, the linked nodes may not have the same WorldView parameter or WorldView parameters as the node to which the linked nodes are added as supporting or opposing nodes. In this case, further embodiments of the present invention suggest a translator node used to provide a mapping or translation between the different WorldView parameters of the two or more maps. The translator node effectively provides a mapping between different WorldView parameters so that a common WorldView with common veracity and relevance or other quality values can be applied to an entire branch of nodes to eventually determine or evaluate the veracity or other quality value of the top node of the branch.

The aforementioned rules and aspects may be combined in a single embodiment. However, different embodiments of the present invention combine only subsets of these rules and features as necessary and appropriate. Further details on the aforementioned rules and details are discussed below that form further embodiments of the present invention.

Figure 3A:
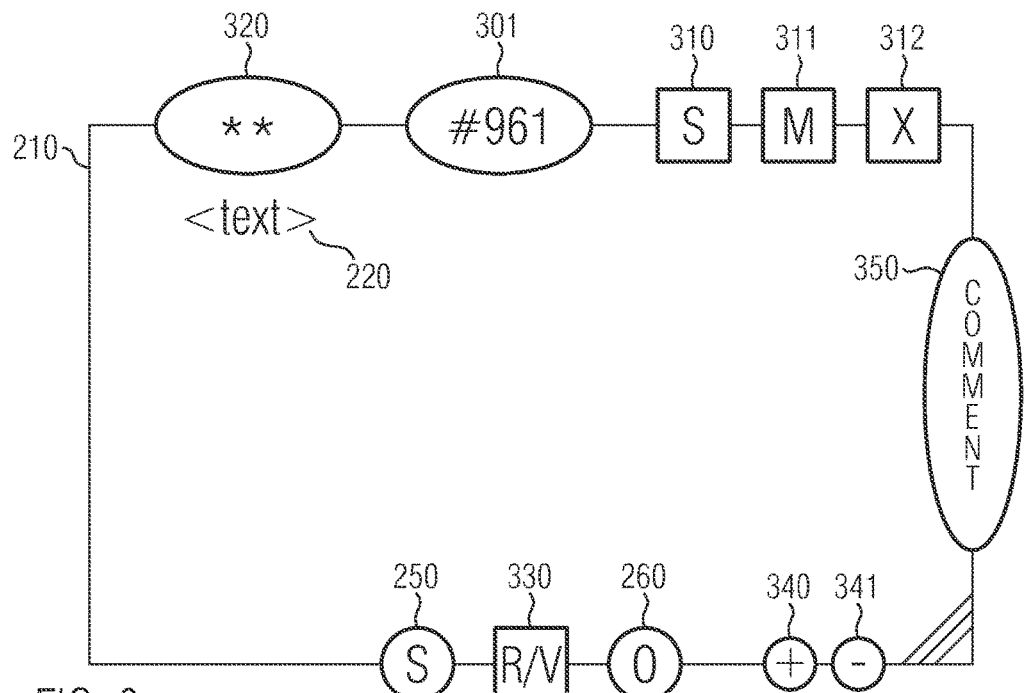
FIGS. 3a to 3d illustrate exemplary layouts and exemplary details of a node representation as is can be used to display a node according to embodiments of the present invention.

FIGS. 3*a* to 3*d* illustrate an exemplary layouts and structures of a node as it can be used in a treelike structure as illustrated in FIG. 2 on a display screen. The various details shown in FIGS. 3*a* to 3*d* are illustrated as examples without limiting the invention to the specific examples and combinations of details shown by these Figures. In fact, it is to be understood that the different details in FIGS. 3*a* to 3*d* can be combined or omitted without departing from the scope and spirit of the invention. As illustrated in FIG. 3*a*, each node may have fields or ports 250 and 260 from which nodes with supporting or opposing assertions can branch off. In some embodiments, clicking on, touching, or otherwise selecting ports 250 and 260 allows a user to add a new node and accordingly, a new assertion. Alternatively, different separate buttons or fields may be used (not shown) for adding new assertions. Each node may have an identification 301 which may be a unique number in some embodiments of the invention.

Each assertion may also have fields or buttons 311 and 312 for minimizing or maximizing the respective node. Each node may further have a field or button 310 providing a user with a select/unselect option for the respective node. When selecting the option 310, for example by clicking or touching field 310, the node remains visible and expanded even if the branch of the tree structure that contains the current node would be collapsed or minimized. Selecting option 310 for node 215 in the example of FIG. 2 would have the effect that when minimizing or collapsing node 212—or branch lines 270 and/or 271—node 215 would remain maximized or expanded. In this case, nodes 212 and 214 may both be minimized or collapsed while node 215 remains maximized if option 310 has been selected for node 215.

The buttons or fields 340 and 341 may accordingly be used to collapse or expand nodes in the displayed tree structure. Alternatively, the collapsing field 341 and/or the expanding field 340 may also be placed on or in close proximity to a branch line, such as lines 270 or 271 of FIG. 2 allowing a user to collapse or minimize the respect branch and the lower level nodes appearing below the collapsing field 341. Using field 341 may for example minimize or collapse the current node 210 and all its child nodes branching off from fields 250 and 260 of that node as supporting or opposing assertions (unless some or more of the child nodes would remain maximized due to the selection of the respective field 310). Alternatively, selecting the collapse or minimize option 341 of node 210 will only minimize or collapse the following child nodes branching off fields 250 and 260 of node 210, while node 210 itself remains visible and maximized. Similarly, selecting option 340 could maximize or expand nodes or branches that have previously been minimized. When minimizing nodes, these modes can be replaced in some embodiments by a small placeholder symbol or icon that still shows and allows the selection of the maximizing option 340 while omitting all remaining fields and the actual text of the minimized node.

In addition to the actual text or media object like graphics or embedded video of the node 210, e.g. "The earth if flat," each node may or may not offer to add comments. The comments can be added using a specially designated area such as port 350 in FIG. 3, which a user can select for example by clicking on or touching port 350. Comments to an assertion may be illustrated in a similar manner as additional nodes in the tree structure. Alternatively, comments may be displayed in a separate field or area on the display screen such as an area next to node 210. Generally, the present invention proposes to distinguish between assertions and comments, as discussed above. While comments can be added and displayed using known commenting technologies, these mere comments do not qualify as arguments, as outlined above. Arguments according to embodiments of the present invention are classified as either a supporting argument or an opposing argument for another assertion. In that, each assertion needs to be a clear statement that can again be subject to opposing or supporting arguments that try to either attack or defend the argument. In this respect, an assertion according to embodiments of the present invention cannot be a question. Distinguishing between comments on one hand and assertions/arguments on the other hand allows the present invention to evaluate and manage a discussion and their arguments as will set forth below in more detail.

Figure 3B:
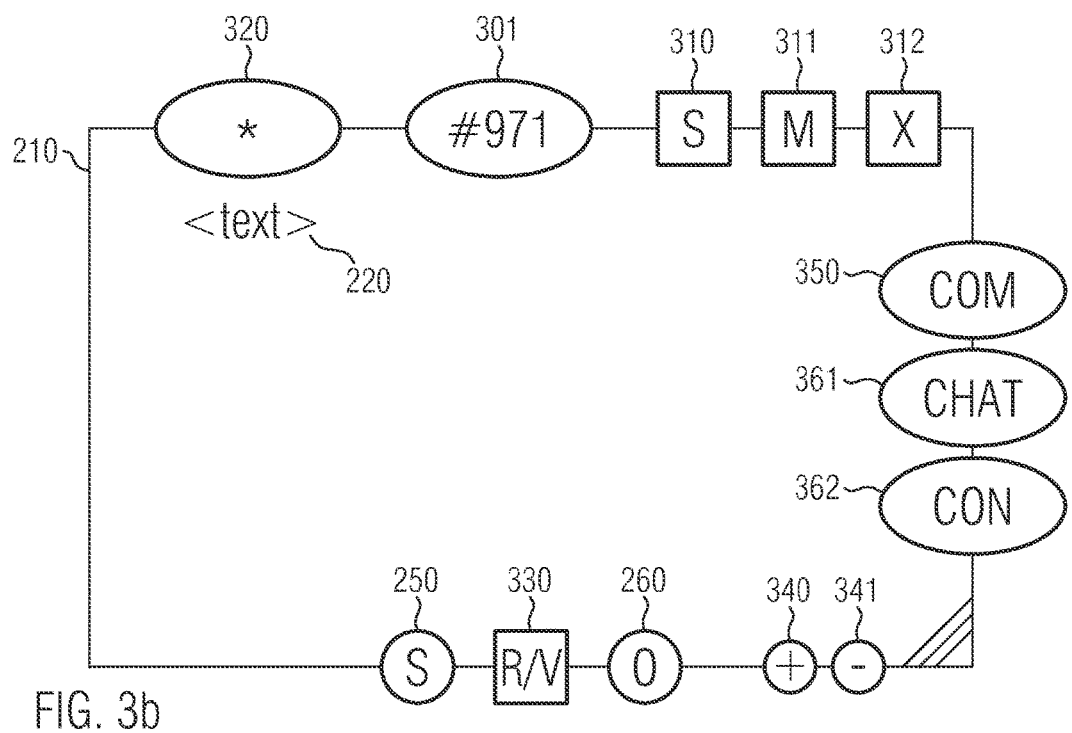
Figure 3C:
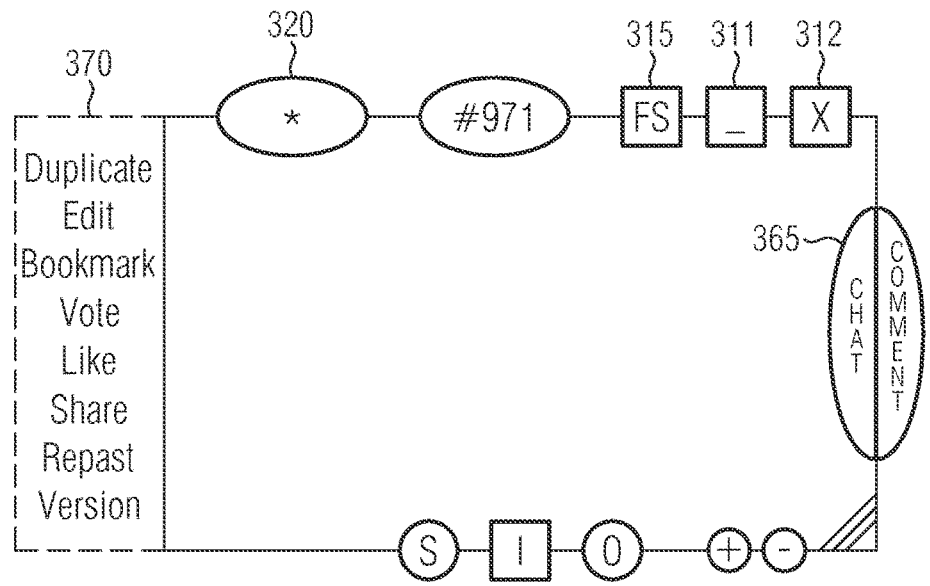

Similar to the commenting functionality that can be triggered using field 350 a chat functionality may in addition or alternatively be provided as illustrated by field 361 in FIG. 3b, or field 365 in FIG. 3c.

Figure 3D:
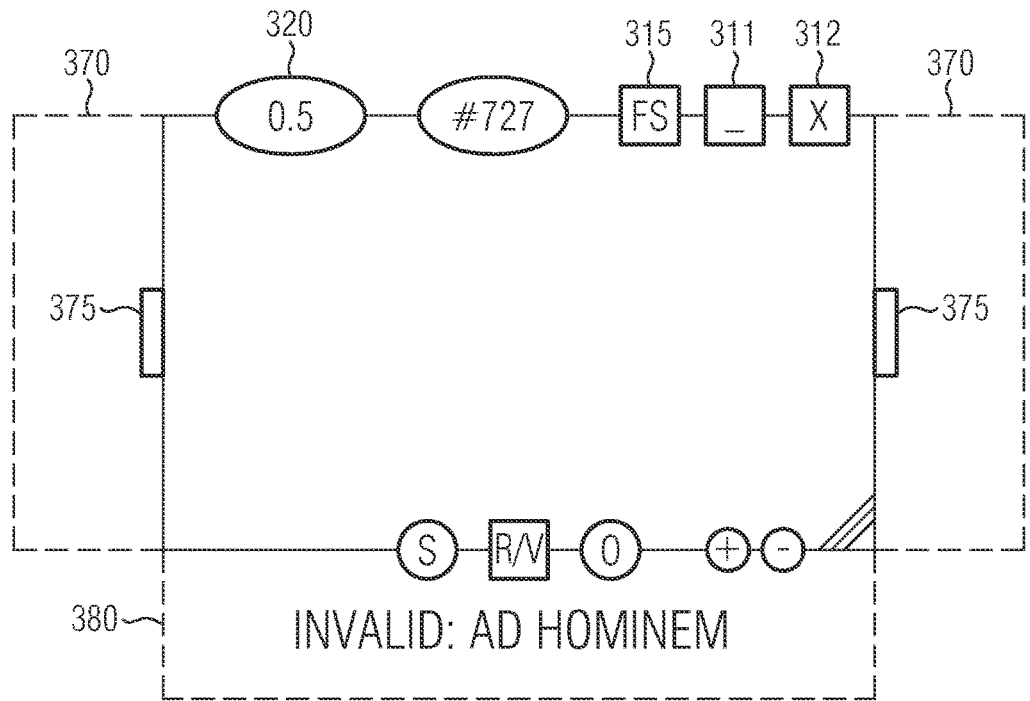

As a further possibility in some embodiments, each node may have a separate field for displaying the respective node in a full screen mode in that the node is maximized to the full display screen. The filed is illustrated by field 315 of FIG. 3c. Further options or fields/ports of a node may be displayed next to the assertion field 220 in a portion 370 allowing a user to select further actions like editing, duplicating, bookmarking, voting, liking, sharing, reporting or requesting a version number. The portion 370 may be permanently visible or only shown if needed, for example, by selecting a specific expansion field 375 as illustrated in FIG. 3d. Alternatively, portions 370 may be expanded or shown upon clicking on or touching the assertion node.

In some embodiments, selecting or touching ports 250 and 260 of a node allows a user to add a new downnode to the node. In further embodiments, selecting or touching ports 250 and 260 will open or close the existing downnodes or branches of nodes that branch off the selected port, if any. For example, selecting or touching port 250 expands the tree structure by showing the branches and downnodes that support the assertion of current node 210. Again selecting port 250 will then collapse these previously opened supporting downnodes and its respective downnodes, if any, of the current node 210. In some embodiments, expanding or opening the supporting assertions by selecting port 250 of node 210 will open all downnodes that link to port 250. As shown in FIG. 2, this may be illustrated by respective branch lines 270 linking nodes 211 and 212 to port 250. Alternatively, any suitable manner such as indicating or highlighting on the screen can be used for illustrating that the nodes 211 and 212 support the assertion of centernode 210. As such, selecting port 250 of node 210 could in some embodiments display, expand or open all downnodes linked to centernode 210 as supporting assertions, i.e. nodes 211 and 212 in the example FIG. 2, as well as their downnodes 214 and 215 that are linked to downnode 212.

However, in alternative embodiments, selecting support port 250 of node 210 will only open or expand those nodes that support assertion 210. In the example of FIG. 2 this would exclude node 215, because assertion 215 is an opposing argument to supporting argument 212 of current assertion 210. By expanding or displaying only the supporting arguments of the current assertion 210, it is possible for a user to obtain an overview or summary of all arguments that support the current assertion while omitting, i.e. not displaying, all possible arguments that contradict or oppose the current assertion. The same applies for the opposing field 260 that collapses or expands the nodes that branch from opposing field 260 of assertion 210. In further embodiments, selecting ports 250 or 260 of a node opens or expands those downnodes that have a specified minimal importance to the argument of the node. The importance of a downnode to the centernode can be determined based on its veracity value and the relevance value associated with the link between the downnode and the centernode. The importance value of the downnode thereby indicates the influence of the downnode to the veracity value of the centernode, since the veracity value of the centernode can again be determined based on the importance values of all (or some) downnodes of the centernode. Alternatively, the veracity and relevance values associated with the downnodes can be used to determine the veracity of the centernode instead of their importance values.

The possibility and functionality of selectively displaying either supporting or opposing arguments for a current assertion allows to evaluate how successful or how convincing an argument of the discussion is.

Distinguishing between veracity and relevance of an assertion allows for a more sophisticated management, display and evaluation of a discussion and its nodes. A specific argument or assertion can be an opposing argument or a supporting argument of another assertion as explained above. Whether or not, and to what degree, the supporting or opposing argument is important for its upnode(s) in the tree structure of the map can have two reasons. The first reason for a node's low or high importance is the relevance of that node's argument to the upnode. Assume node 210's assertion is "the earth is flat". An allegedly supporting node 211's assertion is "water is wet". Node 211 is completely irrelevant for node 210 and thus of no importance to node 210. On the other hand, the allegedly supporting assertion 211 "water is wet" has certainly a high veracity but the high veracity of the statement nonetheless does not render the supporting argument more important for the statement "the earth is flat." Likewise, one will recognize that the same assertion that is assumed to be true and therefore has a high veracity could be relevant in regard to one assertion while being completely irrelevant for another assertion. This means that even a fully true statement can have no or very little importance. This can be reflected by assigning the veracity and relevance values independently to each assertion and by calculating the importance value accordingly.

If the above discussed method and system is used for a different purpose other qualities can be associated with the nodes and links that are similar to the veracity and relevance discussed above. One or more qualities can be applied to the node itself, while one or more other qualities can be applied to the link(s) of a node to its upnodes. Using the same techniques as with veracity and relevance, possibly with respectively adapted mathematical formulas, these quality values or a resulting quality of these values can be propagated to the upnodes or even the top node of the tree structure.

In this respect, an importance value can be assigned to each node, which is based on a combination of veracity and relevance or other qualities that are associated with the node. The importance of an assertion may be a numeric value, preferably, but not limited to, a given pre-defined range. An example is the range −1 to +1 for the importance value, as well as the veracity and relevance values. In regard to the veracity, the value −1 has the meaning of a false argument and the maximum value +1 has the meaning of a true argument. The value 0 in between would have the meaning "undetermined" or "undecided". The same rationale applies to the relevance and importance; +1 has the maximum relevance or maximum importance, while −1 represents no relevance or no importance at all. Different value ranges are possible, such as values between 0 and 1, between 0 and m, between −m and +m, or between n and m, where m and n are different predefined numbers. The different levels of veracity and relevance can have different icons or different colors in the uplink, for which a node includes either an opposing or supporting argument. Similarly, different shapes or different thicknesses of shape lines or link connection lines can be used for different levels of veracity and relevance.

The importance I of a node X, such as node 210 in FIG. 2 can be determined based on the veracity values of node X's downnodes, which are nodes 211, 212 and 213 in the example of FIG. 2, and the relevance values associated with the links between these downnodes and the node 210. Generally, the importance of a downnode for a centernode (to which the downnode is linked as a supporting or opposing argument) can be seen as a multiplication of the veracity of the downnode and its relevance to the centernode. This reflects the idea that an argument is only a "good argument" if it is both, true and relevant. For example, in a climate change debate a study result is agreed to be true. This may depend on who is participating in the debate or discussion. Scientists may consider a study or finding to be proven and thus, absolutely true, while another non-scientists group may believe the study or finding is wrong. This difference in whether an argument is true or not, or to which extend true, can be reflected in the WorldView parameter of a node or map. For one node, different veracity values can be associated with a node, depending on the selected one of multiple WorldView parameters. The same applies to the relevance value. In the example of a climate change debate, all participants could agree that a study, e.g. glacier ice in Greenland melting, is true and assign the maximum veracity value. However, some could say that that could lead to a change in salinity, but disagree on whether this could have any effect on the Humboldt stream. So they would have, given their view, different relevancies for this node.

An exemplary formula for determining the veracity V of a node $n_0$ is:

$$V(n_0) = \frac{\sum_i V(n_i) \cdot R(n_i, n_0)}{i}, \quad (1)$$

where i is a variable used to denote all considered downnodes $n_i$ of node $n_0$, $V(n_i)$ specifies the veracity of a downnode $n_i$, $R(n_i, n_0)$ specifies the relevance of downnode $n_i$ for node $n_0$. The formula basically computes the average of the importance values of all considered downnodes of node $n_0$. Generally, not all downnodes of node $n_0$ have to considered, even though this is possible. Thresholds can be used to filter out those downnodes that have an importance, veracity, or relevance value that does not exceed the threshold. Alternatively, a relative threshold can be applied meaning that a specified total number of downnodes with the highest important values (and/or relevance and veracity) are displayed. For example, a node display threshold may be to display the three downnodes having the highest importance value among all downnodes. Another example displays the two downnodes with a supporting argument having the highest importance value among all downnodes with a supporting argument, and respectively those two downnodes with an opposing argument having the highest importance.

Different and more complex formulas can be used to compute the veracity value of the current node from the importance values of some or all of its downnodes. Another example to determine the veracity V of centernode $n_0$ is:

$$V(n_0) = \frac{\sum_i V^2(n_i) \cdot R(n_i, n_0)}{i}. \quad (2)$$

The difference to equation 1 is that the relevance values of the downnodes $n_i$ are multiplied twice with the respective veracity value. Using this formula, and a value range of [0 . . . 1] or [−1 . . . 1], a small relevance of a downnode has less influence on its importance (also referred to as the impact) to centernode $n_0$ than a small veracity value of that downnode. As noted above, the importance or impact value is generally determined by a multiplication of the respective veracity and relevance values. A further example to determine the veracity V of a node $n_0$ is:

$$V(n_0) = \frac{\sum_i V^2(n_i) \cdot R(n_i, n_0) - \sum_k V^2(n_k) \cdot R(n_k, n_0)}{i + k}, \quad (3).$$

where i is a variable used to denote all considered downnodes $n_i$ of node $n_0$ with a supporting argument (i.e., those downnodes connected to port 250 of centernode $n_0$), and k is a variable used to denote all considered downnodes of node $n_0$ with an opposing argument (i.e., those downnodes connected to port 260 of centernode $n_0$), and i+k is the total number of considered downnodes.

If the equations result in a negative number, the veracity value can be set to the minimum value such as −1 in case of a range of values between −1 and 1. Similarly, a filtering or smoothing operation can be applied to the computed veracity value that sets the value to the minimum value if the computed value is below a pre-defined threshold. As discussed, the veracity and/or relevance can depend on a selected WorldView parameter, so that each node can have multiple, different important/impact values.

The ability to compute a veracity of a node based on its downnodes in the map provides a means for automatically determining or checking whether an assigned importance or veracity value is reasonable. For example, if a user or administrator of the discussion/map intends to assign the maximum importance or veracity value to a specific assertion which, however, has one or more opposing downnode assertions that have non-zero importance, the importance or veracity of that node cannot be the maximum. In this case, an alert message could be displayed informing of the discrepancy between the intended importance value and the existing nodes and their importance and the user could be prompted to rectify the situation. If such an alert situation with inconsistent veracity or importance is determined for a node, the upnodes of the node and/or the downnodes of the node may be highlighted. For example, the respective branches in the map could be highlighted using a different color than the remaining nodes of the map. By this, it is possible to find the cause of the determined discrepancy in that the downnodes that contradict the intended veracity value of the centernode are immediately visible. Likewise, the impact of the centernode to its upnode, possible propagated to the topnode in the map or discussion is highlighted.

The importance or impact of each node may be displayed as illustrated by field 325 of FIG. 3*d*. Alternatively, the importance may be classified into different classes or levels and only those classes or levels are displayed for each assertion. This is exemplary illustrated by fields 320 in FIGS. 3*a* to 3*c* using zero, one, two, three and so on star symbols. Alternatively or in addition, bronze, silver, gold platinum stars or any other similar system to symbolize different levels of importance can be used. If one node has more than one upnode, meaning the argument of the node is a supporting/opposing argument to more than one other assertion, the node will have more than one relevance values, one for each upnode. The veracity of the node, however, is the same for all upnodes and may only depend on the WorldView parameter of the node or map. Accordingly, a node has multiple importance values, one for each upnode. The node may therefore show all or a subset of the importance values (while FIG. 3 show only one such value for conciseness reasons). Preferably, the different levels or classes of importance are user selectable, so that each user can set his/her own preferences as to which importance level is required for the nodes to show. This would mean that different users can have different nodes appear in the branches based on the user preferences and user settings. Additionally, users can override the default branch view selection process by selecting individual nodes to display and their respective order, individually.

According to embodiments of the present invention, the importance or impact of a node to its upnode(s) can be determined based on the veracity value of the node and a relevance value for the link between the node and the respective upnode. The veracity and the relevance values are assigned to each node and link. In some embodiments that only applies to nodes of the discussion node tree or map that have itself no downnodes, while the respective values for those nodes that have downnodes in the map are determined automatically based on the values of the downnodes and the structure of the tree, as will be discussed in more details below. Generally, assigning the veracity and the relevance values for a node and its link to an upnode can be done by the user adding the assertion/node or by an administrator or moderator of the discussion. Alternative embodiments determine the veracity and relevance values based on voting algorithms or averaging algorithms that use multiple rankings or assignments of these values from multiple users and/or administrators. Still further embodiments use external databases, or interpreter functions of internal or external databases. The assignment of veracity or relevance values can also be achieved in an automated fashion using, for example, context or semantic analysis tools that analyze a given assertion, i.e. the text or embedded object 220 of a node 210.

The determined importance/impact value, veracity value or relevance value of a node may further be subject to a threshold or mapping algorithm to result in the final importance or impact value. Generally, any combination of veracity and relevance to obtain an importance of a node may be suitable to be used in the present invention.

Further embodiments of the invention allow a user to select an automatic regrouping of the node tree in an advanced mode in that nodes are shown or not shown and regrouped according to their respective relevance values or veracity values or both. This may be selected by a user through selector field 330 in FIGS. 3*a* to 3*b* and is discussed in more detail below in regard to FIGS. 4 to 7.

A node can have a classification field 380 as shown in the illustrative example of FIG. 3*d*. For example, an administrator or moderator of the discussion, or a user voting, may classify certain assertions as being invalid because they violate a discussion policy. In the shown example, a policy classifies a node as invalid, as it is considered to be an ad hominem attack, meaning a personal attack on the user who created the upnode or on a person that is used or relates to the assertion inside the upnode of the current node. Such a node may be marked as invalid and accordingly highlighted in section 380. Alternatively, such indications or further information on an assertion may be displayed through fields 320 or 325 which then show specific symbols, icons or text indicating an invalid node instead of the importance value or the importance level. According to further embodiments the type of infraction that has been practiced is displayed. Additionally such nodes can, unless specifically asked for, not be shown in tree branches and can, in some cases, be assigned the minimum importance such as 0 or −1.

According to some embodiments of the invention, a level can be assigned to a user representing the user's rights to one or more of: creating new nodes; viewing, deleting or editing nodes; viewing, creating, deleting, or modifying links; viewing, assigning, deleting or modifying qualities like veracity or relevance; or creating, viewing, deleting or editing comments. In other embodiments, a various levels are assigned to a user corresponding to different ones of these types of actions. The levels can also be specific to one or more WorldViews such that the user can have rights to take specific actions only for these one or more WorldView(s).

According to some embodiments of the invention, an approval value can be assigned to a node, a link or even a quality parameter like the veracity or relevance or similar qualities. The approval values can be set or changed by the users according to their user level. The approval values can be values ranges between a predefined value range, like −1 and +1. Alternatively, the approval values referred to herein can denote one of a set of different classifications, like different number star symbols. All suitable kinds of classifications can be used as approval values.

In some embodiments, an approval value can be modified or changed using a voting rule according to which multiple users jointly determine the modified approval value. In these embodiments, a user with a lower/low level can be allowed to vote for the approval or disapproval of the respective node, link or quality. Since multiple users participate in the vote the individual user can only slightly modify the approval value and has a proportional influence on the approval value. In contrast, a user with a high level can be able to modify the approval value directly or with a greater influence than the low leveled user. The user with a high level could even be able to completely set a new approval value. Alternatively or additionally, the vote of a user with a high level can have a greater weight in the aforementioned voting mechanism than the vote of users with a low level. The ability to change or set approval values can be different for nodes, links and/or qualities, depending of the applicable WorldView. The ability for a user to modify or set an approval value can also be different for nodes, links and qualities of one or more WorldViews. The user level can further determine the initial approval value of a new node, link or quality when the user creates the new node, new link and/or a new quality value.

The approval value can interact with the user level. In some embodiments, the approval value and the user level jointly determine whether a node is displayed or not. By this, some users might not be able to even see nodes, links or qualities with low approval values in order to prevent propagation of unverified data/assertions. At the same time, nodes with a low approval value or with only few approval votes can be displayed or highlighted so that a user can identify these nodes and take desired actions/special action. A regular user can, by that, better identify assertions or links between assertions that did not get much approval. Likewise, a moderator of a discussion would be able to take an action on new data, like deleting or approving new assertions. A user can also be allowed to see or modify data he created independent from and unaffected by the approval values.

According to some embodiments, the approval value can be modified by the system if the respective node, link or quality of the approval value has been edited. In other words, changes on a node can trigger changes to the approval value of that node. The modifications of the approval value (or the extent of the modifications) can again depend on the user level of the user that changed the node, link or quality. The system can thereby reset the approval value of changed data back to the initial approval value as defined by the user's level or can compute the approval value in a defined way based on the original approval value and the user level. According to one example that allows the correction of spelling errors without loosing the old approval value is a linear curve that starts at the old approval value if no text is changed and ends at the editing user's initial approval value if a certain percentage (like 5%) of the text is changed. The system may further, depending on the user level, prevent users with a low level from modifying or editing data that has a high approval value, and, by that preventing that high quality data is degraded by low leveled users.

According to some embodiments of the invention, the system allows a user to create an alternative for an assertion/a node. In other words, a user can add new node with an alternative assertion to the assertion of the current centernode instead of creating and adding an assertion that either supports or opposes the assertion of the centernode. If the alternative version of the centernode eventually gains more approval than the original version, the alternative node can replace the original centernode.

According to still further embodiments of the invention, the user level of a user can automatically be adjusted according to the approval the user gains for the user's new created nodes, links or the changes the user made. This can be a small stage less adjustment based on each approval value or a gradual adjustment when multiple (or a predefined number of) changes reach a predefined approval value. The user level can be adjusted differently for different WorldViews. For example, the system can selectively compare the approval of user actions for each WorldView in order to adjust the user level for each WorldView differently.

The system can further monitor how much a user's approval or disapproval of one or more nodes or links matches the user's approval or disapproval of other users in order to determine to what degree a user matches a particular WorldView or the global (World-)View. This concept can further be used to determine the global view or a WorldView-specific user level of the user. Alternatively or additionally, the concept can be used to determine and inform a user how much the user globally or for one or more WorldViews matches other users.

According to some embodiments of the invention, the approval value is a one or two step value or a classifier, determining whether the respective data (which is a node, a link or a quality to which the approval value is assigned to) is unapproved, approved or locked. In the simplest case, the approval value is a value, symbol or other classifier having the meaning of either approved or unapproved/disapproved. This can again be specific to a WorldView or global view of the map.

Similar to the WorldView parameter, the system can define two or more groups of users. Each group can then have its own user levels and the user actions like voting and editing is limited to nodes, links and qualities created by their group. Using the association of users with group, it is further possible to assign different approval values for the same node, respectively one for each group. The same applies to approval values for links and qualities, as well as to voting rules that can be different for different groups of users.

According to some embodiments of the invention, the system does not allow a user to approve or disapprove a node, or to change or create new subnodes of the node, until the user has viewed a certain number of the downnodes in the corresponding subtree of that node. The number of subnodes can be set to all subnodes in the subtree. This aspect of invention ensures and enforces that the user has read sufficient information to understand the reasoning for this node before being able to vote on it or to change the assertion or its associated values. This aspect of invention can further prevent the creation of duplicate downnodes that already exist. If the existing downnode is not a direct downnode of the current centernode to which the user intended to add the new node, the user can—instead of adding the new downnode to a current centernode—link or copy the existing node to the respective centernode.

According to still further embodiments of the invention, the system creates a log of all actions a user has taken and allows to approve or disapprove these actions by other users or by one or more moderators. This provides for a system in which user levels can automatically or manually be created and that allows to determine more information about a user. The system can particularly be used to determine if a user made errors, for example in assigning an approval, veracity, relevance or other quality value, if a user tries to abuse the system or how discussion related the user is in adding or classifying assertions.

The user level can be further split into a map-specific user level and a global user level. The global user level can thereby determine the start level of a user in a specific map. As discussed, user actions like adding new nodes, voting for existing nodes or reading a certain number of nodes of a map can effect and modify the user level of the user. Actions performed by the user in a map can have a major affect on the map-specific user level but only a minor or no affect on the global user level.

According to further embodiments of the invention, a 'challenge view' of a map of assertions can be presented to a user, preferably concerning a map the user has not seen before. The system can prompt the user to approve or disapprove various or a predefined number of nodes, links and qualities. The system can determine a user level for this user in this new map or a global user level for a new user based on the results of the approval process of the challenge view. In the challenge view the approval values of the nodes, links and qualities are not identified or visible to the users. The system or a moderator can also add false links or qualities to challenge the users of the challenge view and its approval process.

According to some embodiments of the invention, the system can throttle or limit the creation and modification of nodes and/or links between nodes. This throttling can depend on the user level of the users. A user can be limited to a certain number of a defined amount of changes per time given frame. The time frame can be as long as days or as short as a minute. The system can further calculate values for two or more timeframes, for example, like allowing a given defined maximum number of changes per day and per hour. This throttling has various advantages as it will be apparent to those skilled in the art. It will allow other users to still be able to follow the changes in a suitable time allowing the users to read them or a suitable timeframe per day. It can further prevent overloading the system. The throttling can further force the users to think twice before making changes or creating new data, thereby enhancing the quality of each action and the map of assertions.

The system can also adjust this throttling according to the total number of users or the total number of changes. This allows users to follow the changes even when there are many users adding or changing data in the same map. The system can also adjust the throttling values according to the total number of nodes or links in a map or according to the regional activity in some areas of a map.

The throttling can be adjusted according to the impact a user action has on the map and its assertions, where the creation of a new node can have a greater impact on the throttling than, for example, the editing of a few letters in the text of an existing node. Changes or creations of nodes or links in a subtree of the map can have lower impact then changes in nodes and links close to the top node.

Alternative or in addition to a throttling based on a fixed number of actions for a user, the system can also provide a so-called "action point pool" to the user and can define so called "action point costs" for each action, like creating, editing, or deleting a node. The system can display his current action point pool to the user and can upfront inform a user how many action points the user will gain per timeframe and how many action points certain changes or creations will cost. The action point gain per timeframe per user can be based on his user level, on how many other users are participating or can be a parameter defined by the map. By that the user is able to plan his actions, especially if he only gains little actions points per timeframe.

Some embodiments of the invention use a prediction model to predict how many users read or reviewed a change in the map in order to determine an appropriate throttling of new changes or new nodes. The prediction can be based on tracking the performed views and actions of all users or on an estimate of how many users have already viewed how many changes. By that, the system can determine how far behind all users, or the current user, are and adjust the throttling accordingly. The system can then slow down the adding of new nodes or changes in the map if many users, for example, a predefined percentage, fall behind the remaining users in viewing or reading recently added nodes or changes. The system can, as an example, classify a node or change as being read or viewed by user if the user selected the respective node as a centernode, expanded the node, clicked on or otherwise selected the node. The status of being read or unread by a user can also be shown on the user display, for example using a different color for highlighting a node or any other means for distinguishing a read from an unread node on the user display. In addition or alternatively, the system can throttle or limit the ability of a specific user to add or modify data of the map while other users have either a different throttling, such as a different number of allowed changes per timeframe, or no throttling at all. The user-specific throttling can be applied to users that only create or modify data on the map without reading other changes or added nodes.

As part of the throttling aspect the proposed system can cache the changes or added nodes that a user input but that are not applied to the current map due to an active throttling period. The cached changes and nodes can be published and/or applied to the map at a later time when the throttling status changed accordingly.

According to some embodiments of the invention, the system can track the number of new or changed nodes, links or qualities and the number of votes or comments. The tracking information can be used to create and display a heat map showing to the users in what areas of the map the most actions occurred either recently or in a specific time frame. The heat map can additionally or alternatively illustrate the distribution of how often the nodes are viewed by the users highlighting, for example, those nodes most users have looked at in a specific time frame or in total.

The system can also provide a means for allowing some user to follow the views of another given user, meaning to follow which nodes the other given user has read, opened, selected, voted for, etc. The information can be provided to the user separately or overlaid on the displayed map.

The system can further comprise means for allowing users to signal or highlight selected nodes, links or qualities either to specific one or more users or to all other users of a map of assertions. This can include that the selected nodes flash or light up for the other user(s), either a specific time duration or until the user(s) confirm the reading of the highlighted node.

According to still further embodiments of the invention, each change in a map or a new node, link or quality added or modified by a user can be flagged or labeled separately for all other users of the map until the other user confirms that he noticed the change. The system can choose a different graphical representation for the changes or new nodes that is distinguished from the graphical representation of those changes and nodes that have been confirmed or read by a user. The system can further provide a different graphical representation for the path through the tree structure of the map linking the changes to the top node of the tree. This allows a user to follow the path from the top node downwards to find all changes. Furthermore, the user is always aware of changes in the area of the map he is currently looking at. A confirmation of the highlighted changes by the user can be a manual action like clicking on or selecting the node or one of its displayed components, or can be automatically detected by measuring the time a change or the respective node is displayed in the current view of the user.

An additional option according to the invention is to create email notifications of the changes. The term email notification as used herein refers to any sort of electronic notification that can be sent or pushed to users including, for example, email message or messages of information and social networks. The notifications can contain links that direct a user to a change. For example, the provided link can direct the user interface to a textual description or graphical representation of a change. The email notification can further be used to trigger or allow user actions like the above described voting aspect of the invention. Replying to a notification email can allow a user to vote for, approve or disapprove the respectively notified change. Additional user actions that can be triggered by the change notification emails are adding comments to the notified change. Replaying to the email can further provide a template, a special syntax or defined keywords allowing the user to add changes to the map just by answering the email. For example, the expressions 'PRO:', 'COM:' and 'EDIT:' can be used as keywords. A reply to an email notification containing the expression 'PRO:' as a keyword adds the text after the keyword 'PRO:' as a new supporting node and the text immediately following the expression 'EDIT:' is used to edit the text of the notified change. The mentioned expressions are to be understood as mere examples. Any other suitable syntax or keywords can be used in compliance with the teachings of the present invention. Instead of replying to a change notification the user can be directed by the notification to a respective template allowing the user to input desired actions like editing changes or nodes, adding new nodes or voting for the notified one or more changes. Moreover, the actions a user can perform in reply to a change notification can depend on the user level of the user as discussed above.

The above discussed flagging or notifying of changes to users can be limited on areas of the map the user is interested in. This can be determined, for example, by the amount of time the user spent looking at the different areas of the map or the number of actions the user performed in these areas of the map. It can further extend to changes in a node or tree in another map, that is linked to a node in the current map. Alternatively, the user can manually flag nodes he is interested in, which is one of the user actions discussed herein.

The system can further limit the change flags and/or email notifications according to the qualities, like veracity and relevance of the related nodes. For example, only those changes may be flagged or notified to the user that have a high impact on the top node or the nodes the user is interested in.

According to some embodiments of the invention, the system allows a user to create a whole subtree of nodes and respective links prior to publishing the subtree in the public map. In other words, the user can create a more sophisticated tree, like a whole justification or reasoning before this tree is visible to all remaining users. Only by adding or linking the tree as a subtree to an existing map reveals the user's subtree to the other users. This prevents other users from prematurely changing or interacting with parts of the subtree until the user publishes the subtree through linking or adding to the public map.

The system can be further configured to allow a defined group of users to collectively work on defined nodes, subtrees or areas of a map. The same functions (user actions) like approval, voting, throttling as disclosed above in regard to a user can be provided the group of users allowing the group of users to jointly act like a single user. For example, the nodes, subtrees or areas may require the approval of the whole group or a defined number or quota of users to be published in the map. The same applies to other user actions that can be performed on the map and its components.

In addition, a search function can be provided for a map. The search function can be a full text search or a search for keywords in the nodes. In addition, the search can provide a search in specific nodes only, such as only in PRO or only in CON nodes. The system can limit the search on one or more subtrees. The system can display the search results using a graphical representation of the search result highlighting all links from the top node of a map that end in one or more nodes containing the search results.

According to still further embodiments of the invention, the users can repeatedly vote for the topnode, nodes or links of map. This repeated voting of a user can be allowed after predefined time periods. Alternatively or additionally, a user could be allowed to re-vote for node or link after the subtree containing the node or link has been changed. It can further be foreseen that a user is allowed to re-vote for node or link before and after the user read or looked at the respective downnodes or subtree of the respective node or link. A still further option is to allow voting according to a fixed time schedule or before and after the map reached some defined state. A state of the map can refer to the map's appearance, meaning its nodes and their links, at a given point in time after the map was created or published. The states of a map are discussed subsequently in more details. With these options for re-voting of nodes or links it is possible to gather information such as how much impact the map had on the specific user. In other words, it is possible to determine and display how a specific vote—for example on the topnode assertion of the map—changed over time and/or after the user read the (supporting and opposing) assertions (and the comments, if any) of the remaining downnodes in the map. The result can be shown to the user on the user display or can be used for statistical purposes to determine how much impact a specific group of users or all users created on a specific assertion, for the example a topnode of the map.

According to some embodiments of the invention, the system can log some or all user actions over time. These recorded or logged user actions can then be replayed for the respective user or they can be replayed for all users to illustrate how the whole map changed over time. By that the system can create views of different states of the map at different times and can even display an animation how the map evolved. The system can further show the view and animation for a specific user, for example to illustrate the map's nodes and links (also referred as the map's state) at the time when that user did a specific change. A further example for using a record of the map's states over time is to display a user-specific animation showing the user's personal evolution of the map.

According to some embodiments of the invention, the system is further configured to graphically represent a map by showing the impact of the downnodes in the subtree(s) of the map on its topnode. As discussed, the qualities, like veracity and relevance, and the approval result of nodes and links according to embodiments of the invention can have an impact on their upnode and finally on the topnode, which is reflected by the node's impact value or impact quality. This graphical representation can show a the partial overall impact on the top node using any graphically suitable manner such as color coding techniques or varying line width.

The system may further be configured to sort or highlight other map information/elements like a change log of the overall impact of the map's topnode.

According to some embodiments of the invention, the system is further able to highlight nodes and/or links of a map that could be of interest to one or more users. Examples are nodes or links that are new or recently added to the map, that are rarely noticed or that have an approval value that is (highly) disputed by one or more high level users or moderators. The highlighting or visually emphasizing of nodes and links of potential interest to users further allows high level users to efficiently approve or disapprove newly added data, map changes or to solve conflicts that occur by added data or changes. Alternatively or additionally, the aforementioned nodes and links of potential interest to users can be notified to the users by the change notifications discussed above.

According to some embodiments of the invention, a user has the possibility to evaluate an assertion by, for example, selecting a "conclusion" option as exemplary shown by field 362 in FIG. 3b. Such a conclusion or evaluation may trigger an automatic determination or calculation of the veracity of the specific node, based on its downnodes and/or their importance, their veracity and their relevance values in the discussion tree. This will become more apparent from the below details in regard to FIGS. 4 to 7. The "conclusion" option 362 of a node may, alternatively or additionally, provide more detailed information on the veracity of the current node. For example, the conclusion of an assertion can highlight or provide the strongest path through the tree of assertions showing the nodes with the highest importance for the assertion and/or which nodes and branches contributed the biggest amount to the current node's veracity value. Likewise, the opposite, meaning the nodes and branches that diminished a nodes veracity value the most, could also be shown using paths, branches or individual nodes. The "conclusion" can also be displayed to the user as a separate list, textually distinguishing and listing the relevant nodes. This could even be split or distinguished between those nodes with the highest relevance and those with the highest veracity. Another example is to display or provide information (e.g., in sections 370) explaining how the veracity value was determined. The information could state that downnode #123 supports the argument most and has an impact of 0.8 (or three stars), while downnodes #125 and #129 have the strongest counterarguments with each having an impact of 0.4. The information may be presented in form of a table listing the downnodes and their respective impact/importance values. More advanced views of the map may list the veracity and relevance values of each listed downnode. It is also possible that not only the downnodes of a node are listed, but further downnodes of these downnodes in the strongest path(s).

Figure 4A:
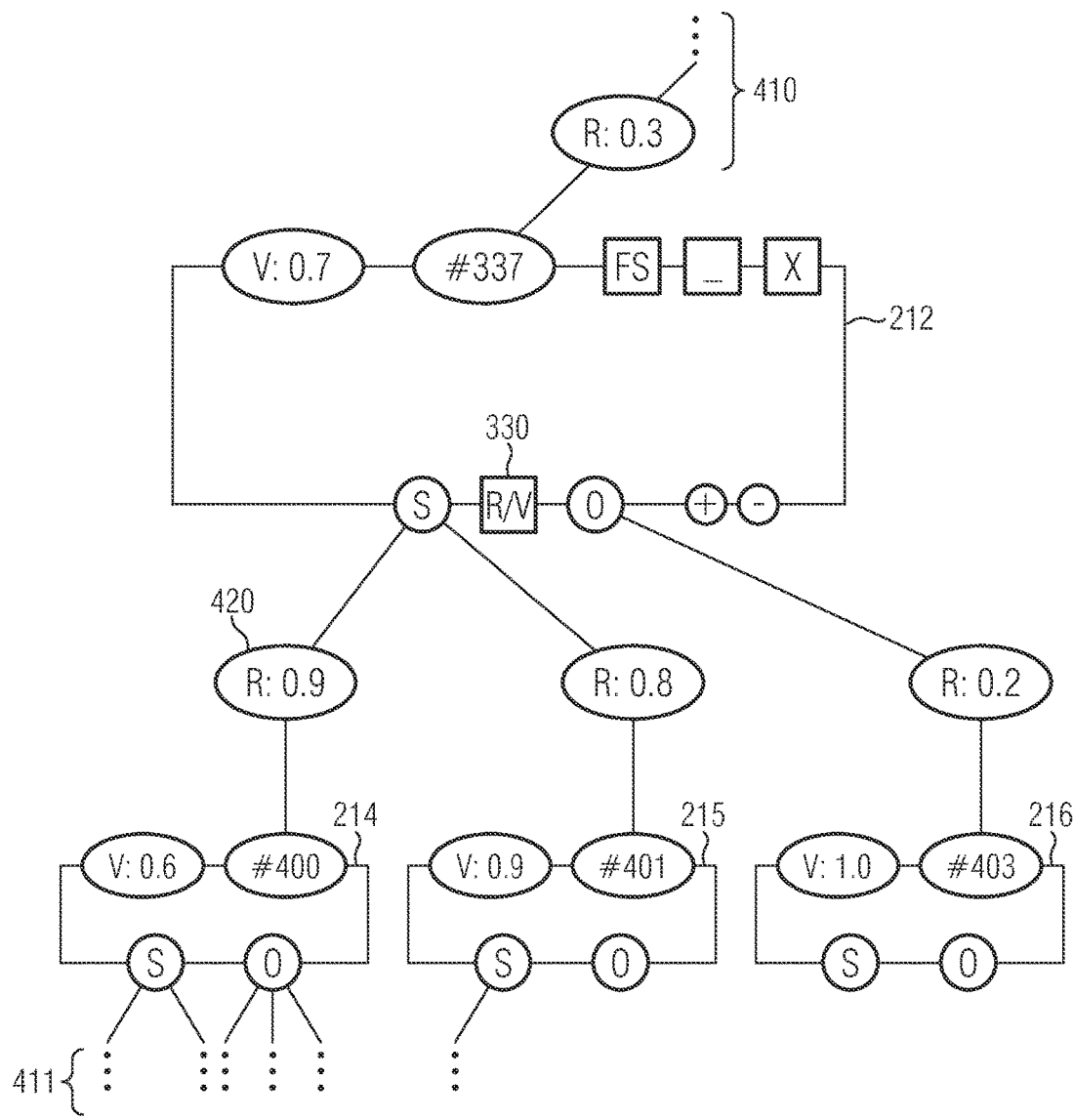
FIGS. 4a and 4b illustrate an advanced view of a node map representation as is can be used to display a nodes and their relation according to embodiments of the present invention.
Figure 4B:
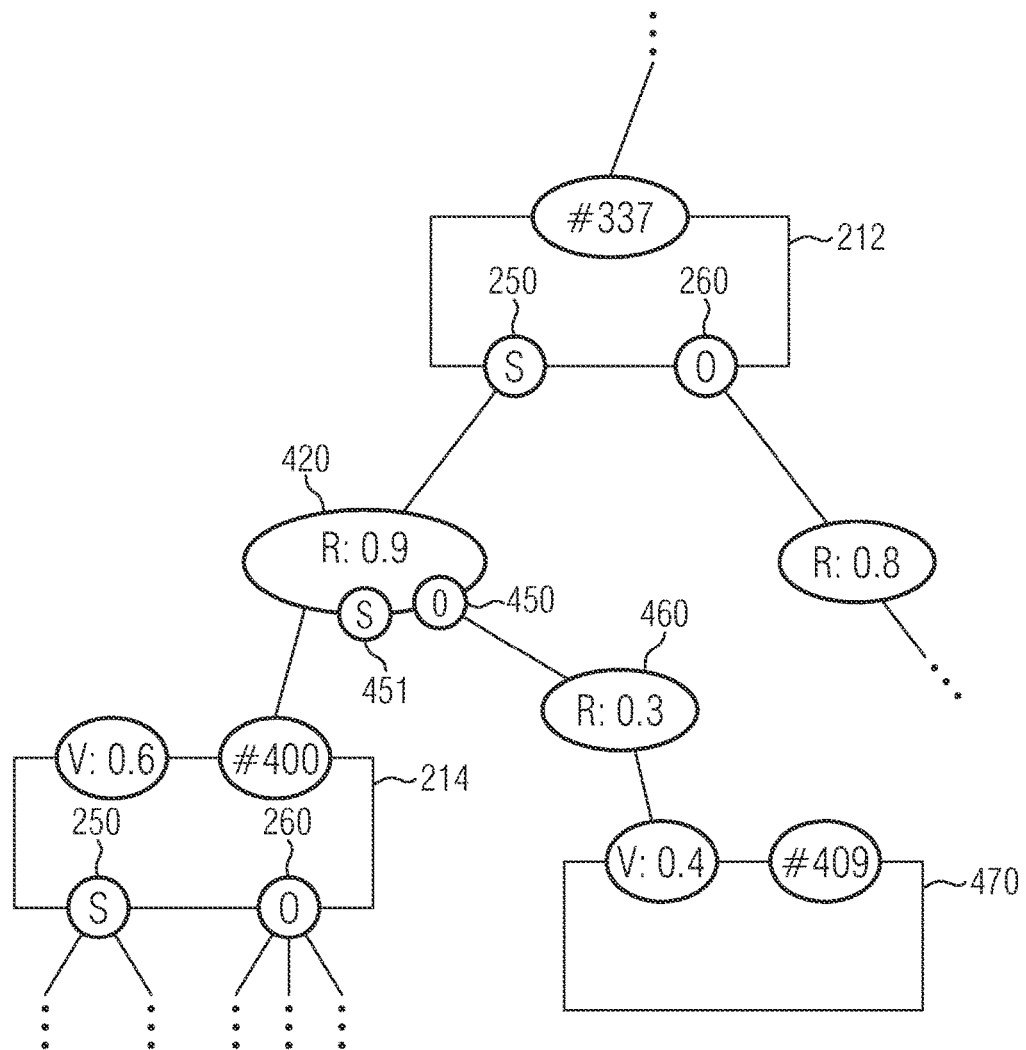

FIGS. 4a and 4b show exemplary embodiments of an advanced view of nodes of a map or nodetree visual representation of a discussion. Illustrated in FIGS. 4a and 4b are node 212 having three downnodes, of which two have supporting arguments (nodes 214 and 215) and one has an opposing argument (node 216). As indicated by links 410 and 411, the illustrated nodes 212 to 216 may have further downnodes and upnodes. In the embodiments using the advanced view, the relevance and veracity values are shown instead of the consolidated importance value that is shown in the basic or normal view of FIGS. 3a to 3b. A user may switch between these different views, for example, by using selector field 330.

The exemplary illustration of FIG. 4a shows that veracity values are assigned to and displayed for each node. The relevance values of the nodes, however, are displayed and related to the link connecting the nodes with their upnodes in the nodetree. In other words, the relevance of a node means how relevant the assertion is for the upnode that it is linking to. In the example of FIG. 4a, node 214 has a relevance of 0.9, being used as a supporting argument, with regard to its upnode 212. The same node might have no relevance if used as an opposing argument. This means that node 214 has a relevance of 0.9 as a supporting argument for node 212. In further embodiments of the invention, a node may be linked to more than one upnodes. For example, the assertion "water is wet" could be a supporting argument with a specific relevance for an upnode with the argument "if you fall into the fountain your clothes are wet." The same node containing the assertion "water is wet" can be an opposing argument with a specific relevance to another upnode containing the assertion "paper boats float." The relevance is therefore assigned to or associated with the link of a node to its upnode for which the node contains either a supporting or an opposing argument. On the other hand, the veracity is assigned to the node as such, independent of which upnode(s) it is uplinked to. However, the veracity value may depend on the WorldView parameter. The advanced view of FIG. 4a allows a user to understand why a certain argument is of high or low importance to the argument of its upnode, which is due to its relevance, its veracity or both. The advanced view also allows a user to show or hide nodes and their assertions that are below or above certain thresholds for veracity and/or relevance values. This can be implemented using filtering options where a user can specify that he wants to see only those assertions that are above a given or specified relevance value threshold or those that are below or above a given veracity value. By this, a user can better understand and evaluate supporting or opposing arguments based on their relevance and/or veracity. In the regular or basic view, illustrated by FIGS. 3a to 3d, a user would instead only see the impact or importance of the node's assertion without seeing the reason or cause of the importance. As an alternative for switching between the regular and advanced view, a user by clicking or touching on the importance indicator (e.g., the star(s) symbol 320 in FIGS. 3a to 3c) a popup shows the veracity of the node and relevance(s) to the respective upnode(s), given the currently shown uplink(s) of the node.

FIG. 4b illustrates an alternative to FIG. 4a in which a further option is added. In this example, supporting or opposing downnodes can be added to the relevance value through ports 450 and 451 respectively. This allows a user to add nodes that serve as opposing or supporting arguments for the relevance of node 214 as a supporting argument for node 212. Notably, the downnodes of relevance 420 do not affect or influence the veracity of node 214, but only the relevance of node 214 to node 212 as a supporting argument.

The relevance 420 in the example of FIG. 4b can itself be seen as a node. The nodes' assertion is the statement "node #400 has a relevance of 0.9 to node #337" or more precisely "node #400 has a relevance of 0.9 to node #337 as a supporting argument". The relevance R of node 214 to its upnode 212 (i.e. R=0.9) can be either the veracity V of node 420 (i.e., R=V=0.9) or at least derivable from the veracity value V of node 420. By this, the veracity of node 420 and thus, the relevance of node 214 to node 212, can be computed based on the importance of the downnodes of node 420 (which is node 470 in FIG. 4b). The same algorithm or formula as discussed above can be used for the computation. Further embodiments anticipate different algorithms or formulas for computing the veracity of a "regular" node such as nodes 212 and 214 and for computing the veracity of a "relevance node" 420. These two different sorts of nodes may be visualized differently, as indicated in FIG. 4b where the regular nodes 212 and 214 have a rectangular shape while node 420 has a circular shape. Different colors, backgrounds or sizes could also be used to distinguish between different sorts of nodes. Node 470, which is a downnode of node 420, is visualized as a regular node since its assertion is a "regular" argument. Assuming node 212 includes the argument "if you fall into the fountain your clothes are wet" and its downnode 214 includes the supporting argument "water is wet". Independent of the veracity of node 214, its relevance 420 to node 212 may be attacked using the opposing argument "the fountain has no water". This argument is then included in node 470, which has its own veracity value 475 and a relevance value 460 specifying the relevance of node 470 as an opposing argument to node 420. Both, node 470 and relevance 460 can themselves have supporting and opposing downnodes. While node 470 opposes only the relevance 420 of node 214 to its upnode 212, the veracity of node 214 may be opposed by a further downnode of node 214 with an argument such as "the temperature is below freezing point". It should further be noted that even though node 420 is located in between nodes 214 and 212, node 420 is not a downnode of node 212, at least not for the purpose of calculating the veracity of node 212, since node 420 provides only the relevance value of node 214 to node 212.

According to further embodiments, nodes can be displayed differently depending on their veracity and relevance values. As discussed above, the importance of a node can be determined based on the nodes' veracity and relevance values. As also mentioned above, user settings may allow to filter which nodes are displayed and which are not displayed, for example based on their importance values. A threshold could be set that must be exceeded in order for a node to be displayed. This allows a user to display only those nodes that have a predefined importance. When distinguishing between veracity and relevance of a node, e.g., in an advanced view mode, a required minimum importance of a node (in order to be displayed) may be achieved through a high relevance or through a high veracity value. In an illustrative example of FIG. 5, node 210 has two supporting downnodes 520 and 521 and two opposing nodes 522 and 523. The two supporting nodes 520 and 521 however are distinguished in that node 520 is an node that supports the relevance of upnode 210 to the upnode of node 210 (not shown), symbolized by the R in field 530, while assertion 521 supports the veracity of upnode assertion 210, symbolized by the V in field 531. This may be further highlighted on the display screen using different links between the nodes. In one example, an assertion that supports or opposes the relevance of the upnode is presented with a solid line while those assertions that support or oppose the veracity of the upnode 210 are linked by a dashed line 511. Alternatively, different colors or different styles of lines may be used to distinguish between arguments that oppose or support the veracity and those that support the relevance of the upnode.

It is also anticipated that the relevance value be depicted by the thickness of the link's line. In addition, or as an alternative, the downnodes may have an indication 530 or 531 that indicates whether or not the node pertain—or pertain mainly—to the relevance or the veracity of its upnode 210. For this, the field 320 as illustrated in FIG. 3 may be used, but likewise an additional field similar to 320, could be added to the node. Whether or not a downnode supports/opposes the veracity or the relevance of the upnode can be determined through a filtering or thresholding operation.

A node is classified as being important with regards to the relevance of an upnode if the relevance value exceeds a defined threshold value. Similarly, a downnode is important for the veracity of its upnode if its own downnodes' veracity values exceed a defined threshold value. In some embodiments, the same downnode may have importance for both, veracity and relevance of the parent node. In this case, the same argument may either be duplicated such that a first copy is displayed as an argument supporting or opposing the relevancy and a second copy is displayed as a node supporting or opposing the veracity of the parent node. Alternatively, the node is displayed only once while the indication, such as indications 530/531, indicate that the child node is important for both relevance and veracity of the parent node. Likewise, the nodes may be linked through two lines; one indicating an impact on the veracity and the other line indicating an impact on the relevance. Further criteria for determining whether or not a node is important for the relevance for its upnode could be that the relevance value exceeds a defined threshold while at the same time the veracity of the node also exceeds a defined threshold. This means that only those nodes are shown that oppose or support the relevance of the parent node and that also have a certain degree of veracity. This would exclude all those nodes that clearly oppose/support the relevance of the parent node but that are not classified as being true enough. By this, not only the individual veracity and relevance values are considered for filtering or thresholding but in addition the overall importance of the downnode can be considered.

Figure 5:
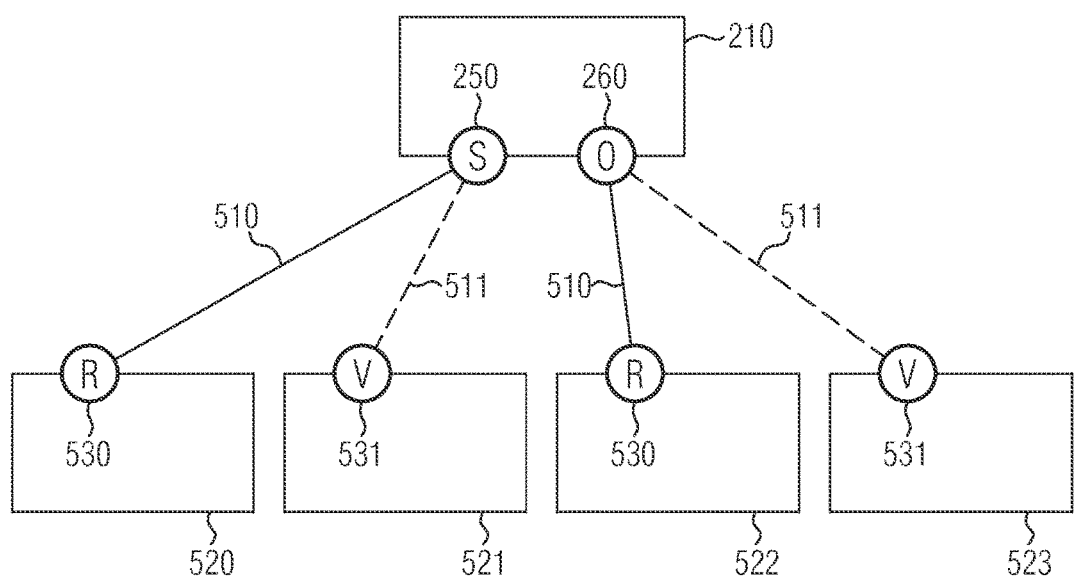
FIG. 5 illustrate an advanced view of a node map representation as is can be used to display a nodes and their relation according to embodiments of the present invention.
Figure 6A:
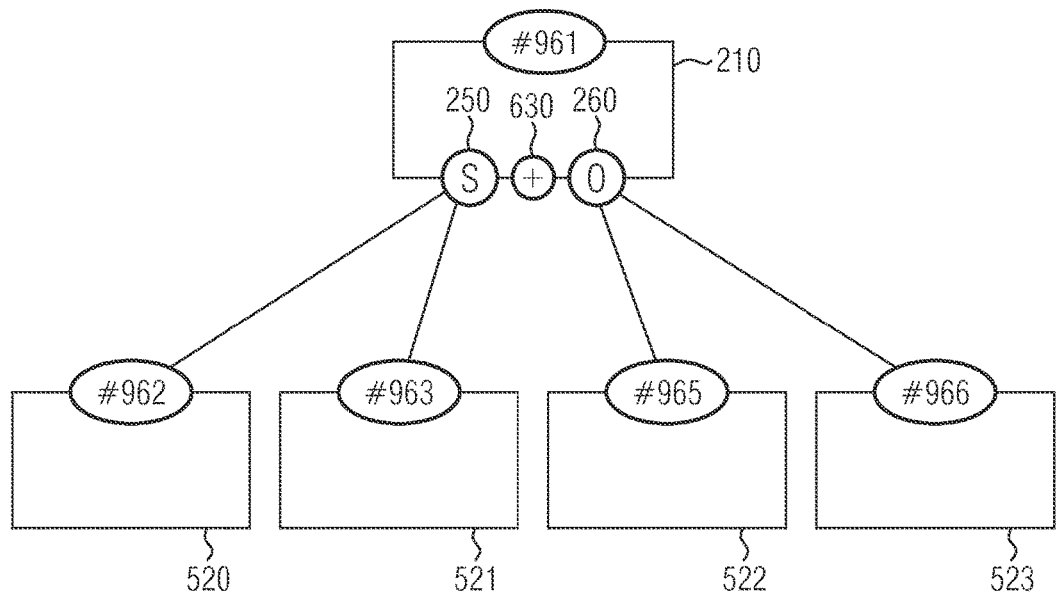
FIGS. 6a and 6b illustrate an advanced view of a node map representation as is can be used to display a nodes and their relation according to embodiments of the present invention.

According to some embodiments, a user can switch between the general view of nodes showing only the importance of each node and an advanced view as discussed in regard to FIG. 5 and/or an advanced view discussed in regard to FIGS. 4a and 4b. An example for switching the view is given by FIGS. 6a and 6b. FIG. 6a shows similar to FIG. 5 a node 210 and four downnodes 520 to 523 of which two are supporting nodes and two are opposing nodes. The view illustrated by FIG. 6a does not distinguish between whether or not the downnodes concern the veracity or the relevance of node 210. As discussed above, a user may switch to the advanced view, for example using a special selector 630 that is selectable by the user for node 210. Selecting the advanced view will change the appearance of the node structure into the example illustrated by FIG. 6b.

Figure 6B:
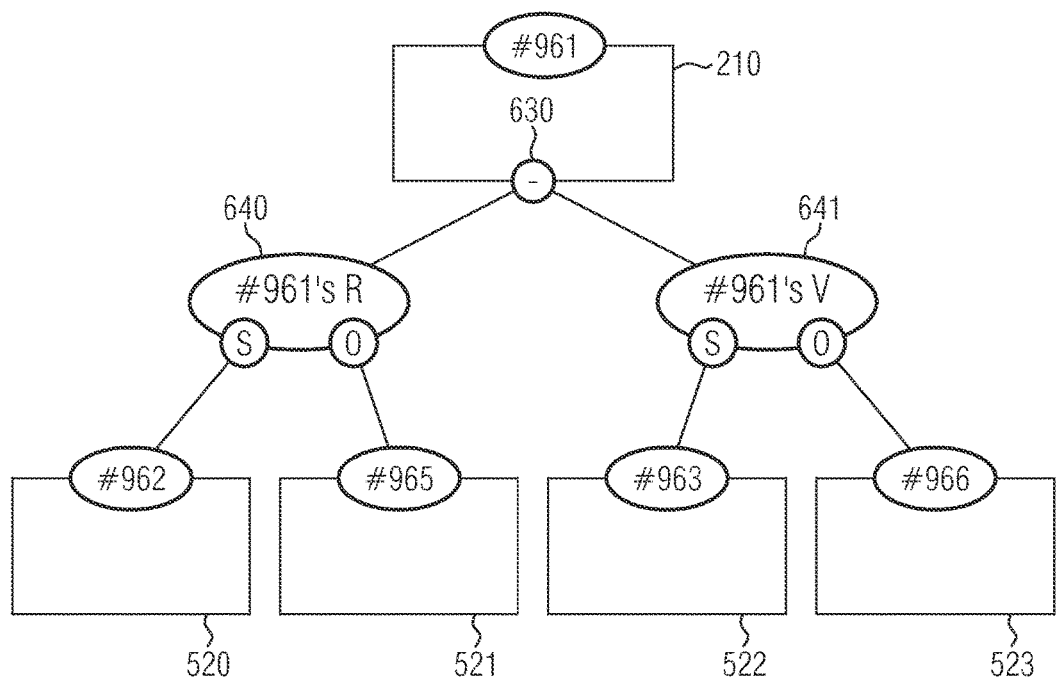

According to FIG. 6b, intermediate nodes 640 and 641 branch off centernode 210. Intermediate node 640 connects with downnodes 420 and 422 that support or oppose the relevance of node 210 (to its upnode; not shown). Similarly, intermediate node 641 connects those downnodes 421 and 423 with node 210 that support or oppose the veracity of node 210. A user may switch back to the original view by again selecting selector option 630 of node 210.

In the above embodiments discussed in regard to FIGS. 5, 6a and 6b, a third class of nodes can be used. A first class of nodes shows those nodes that are relevant to the veracity of the upnode and a second class denotes those nodes that concern the relevance of the upnode, similar to FIGS. 5, 6a and 6b. The third class of nodes denotes those nodes that are not classifiable as relating to the first or second class. In other words, in addition to those nodes that support either veracity or the relevance of the upnode, additional nodes may be illustrated in the tree structure as nodes whose importance is concerns both, the relevance and the veracity of the upnode. This may be appropriately illustrated on the display screen may be likewise subject to filtering and thresholding in order to display only those nodes that have a required minimum importance. This improves the usability of the discussion tree when a user wants to assess the quality of assertions and improves the scalability of the displayed assertions in that a selective filtering and thresholding can be applied that distinguishes between relevance and importance of assertions.

Figure 7A:
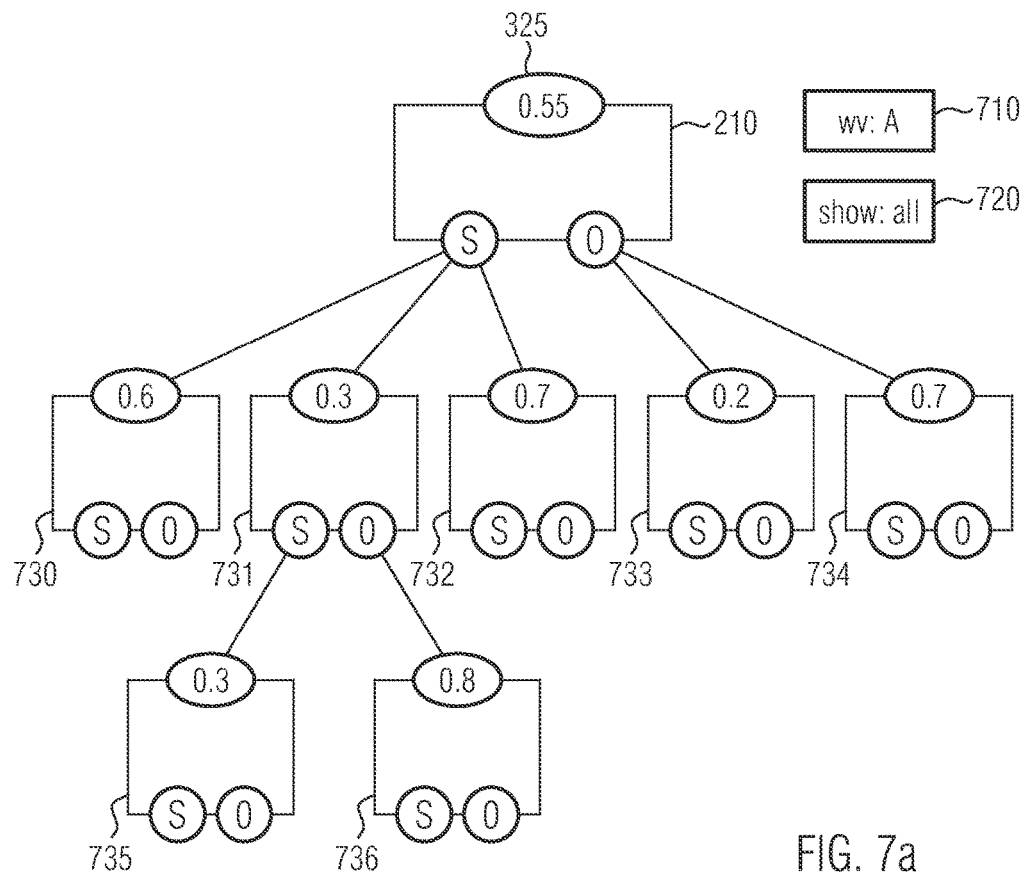
FIGS. 7a to 7c illustrate a schematic representation of nodes allowing to distinguish between or select multiple WorldViews according to embodiments of the present invention.
Figure 7B:
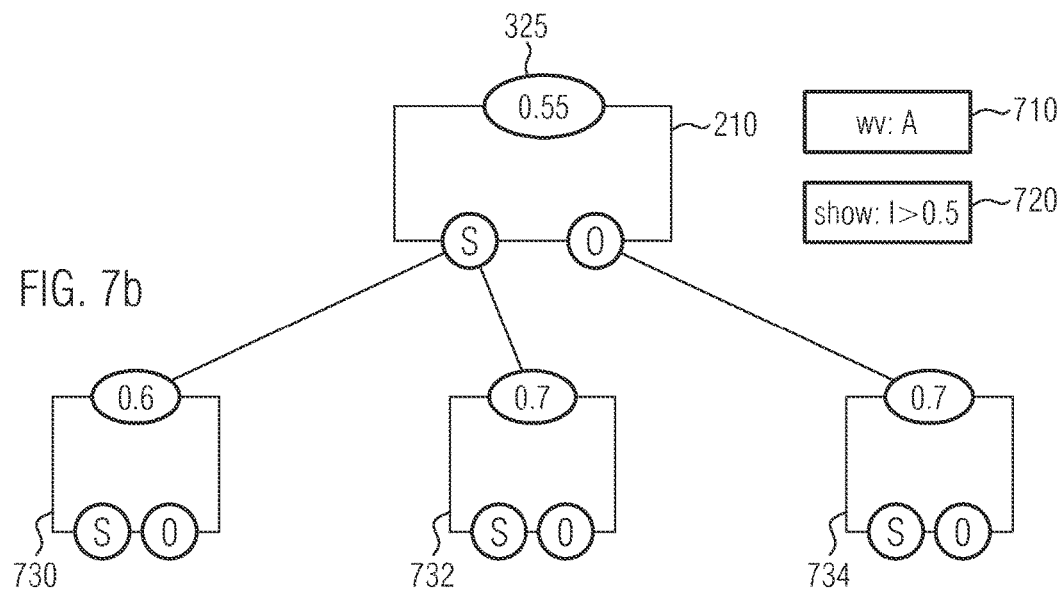
Figure 7C:
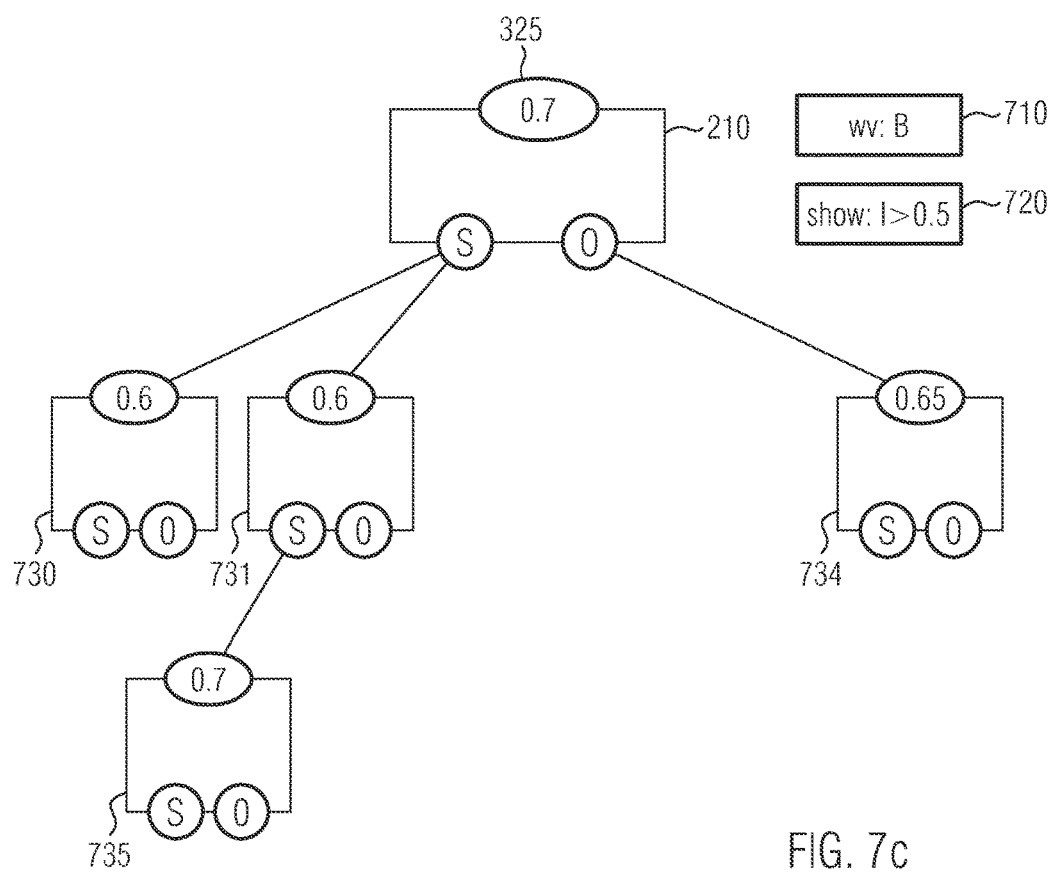

FIGS. 7a to 7c illustrate embodiments of the present invention in which different WorldViews (also referred to as perspective, user perspective, importance classifier, and point-of-view) can be applied to the nodetree map and/or individual nodes. As mentioned above, the importance, the veracity and the relevance values are determined or set for each node. However, these values may depend on the user's perspective. For example, the same node could be true for one user but a false statement for a different user. Similarly, different groups of users may have different points of view. For example, a group of university scientists using the discussion model according to present invention may apply a certain policy defining which nodes are true and to what extent. For example, the node "the earth is flat" could have the minimal veracity value for such a group of scientists. The same assertion "the earth is flat" could however be true for a different group of users that absolutely believe in that the earth is flat due to their religious reasons. This means, the actual veracity value and accordingly the importance value of an assertion can depend on the users' perspective or point of view. The same applies to the relevance values. Some embodiments of the present invention allow reflecting different perspectives within the tree node structure and its visual representation on a display screen.

FIG. 7a shows exemplary a section of a discussion or node map with eight nodes ordered respectively in three levels. In the same way as discussed above, a centernode 210 has five downnodes of which nodes 730 to 732 have supporting arguments and nodes 733 and 734 have opposing arguments. In the illustrated example, downnode 731 has itself two downnodes. Further displayed is a field 710 showing the currently selected WorldView parameter or user perspective for the displayed node map. A user should be allowed to select and accordingly change the WorldView parameter and to add further WorldView parameters using respective elements of the user interface. The different WorldViews can be visualized and denoted by different names such as "scientist's view" or "Joe's perspective." Alternatively, predefined WorldView parameters can be offered by the system that may be chosen by a user. The predefined WorldView parameters can be globally applicable to all maps and discussions, which is a useful feature when copying nodes, branches of nodes or entire map across different maps and discussions. In the example shown in FIG. 7a, the currently selected WorldView 710 is denoted by "A." Preferably, a user can change the labels or names of the WorldView parameters that are displayed in field 710 on the display screen. Instead or additionally, the WorldView may be displayed in some or all of the displayed nodes. The example of FIG. 7a shows a basic view since each node has a field 325 showing the importance value of that node to the assertion of its upnode (instead of showing the veracity and relevance values). Alternatively, the basic view does not show numerical importance values but classifies these values into different categories visualized through symbols such as the star symbols 320 discussed with regard to FIG. 3.

Further illustrated is a field 720 displaying and allowing a user to select a threshold for displaying nodes. In FIG. 7a no threshold has been selected so that all nodes are displayed. As discussed, a user may select that only those nodes are displayed that have at least a minimal importance. All nodes with less importance are not displayed. For example, a user could select that only nodes with three out of five maximum stars are displayed, if using a view in which the importance values are categorized into different stars levels. In an advanced view (not shown) different threshold levels for the veracity and relevance values can be selected by a user instead of or in addition to a threshold level for the consolidated importance value. Alternatively, a relative threshold can be applied meaning that a specified total number of downnodes are displayed, preferably those nodes with the highest important values (and/or relevance and veracity in an advanced view). For example, those three downnodes having the highest importance value among all downnodes are displayed. Another example is to display those two downnodes with a supporting argument having the highest importance value among all downnodes with a supporting argument, and respectively those two downnodes with an opposing argument having the highest importance.

FIG. 7b shows the node map of FIG. 7a after a user has changed the display threshold level 720 from "no level"/ "show all" into a minimum importance level of 0.5. This means, that now only those nodes are displayed whose importance value is greater than or equal to 0.5. Downnodes 731 and 733 of centernode 210 are accordingly not displayed since their importance values are below the selected threshold of 0.5. Because downnode 731 is not displayed, all of its downnodes are also not displayed, even though node 736 exceeds the selected threshold. However, the relatively high importance value 0.8 of node 736 as an opposing argument to node 731 has the effect that the importance of node 731 (as a supporting argument to centernode 210) becomes small. In other words, the argument in node 736 is a strong counterargument to the argument of node 731 so that the argument of node 731 itself becomes a weak argument for the assertion of node 210. The weak argument of node 731 is thus not displayed under the selected threshold.

FIG. 7c shows the same centernode 210 as FIGS. 7a and 7c after the user changed the WorldView parameter from "A" into "B." The importance threshold display level 720 has not been changed but maintained as set in FIG. 7b. As a result of changing the WorldView parameter, the importance values of all or some nodes can be changed. This change of the importance values could be caused by different veracity values and/or different relevance values assigned to each node and for each link according to WorldView "B." In the example of FIG. 7b, the importance value of nodes 730 remains the same as under WorldView "A." The importance of node 734 however has been changed from 0.7 according to WorldView A into 0.55 according to WorldView B. In contrast to FIG. 7b, node 732 is not displayed in FIG. 7c. This means that the importance value of node 732 according to WorldView B is smaller than the threshold of 0.5. The same applies to node 733 whose importance value is below the threshold 0.5 according to both WorldView A and WorldView B. In contrast to FIG. 7b, node 731 is displayed when selecting WorldView B, since its importance value according to WorldView B is 0.6. Also the downnode 735 of node 731 is displayed since its importance value also exceeds the selected threshold of 0.5. On the other hand, the importance value of node 736 according to WorldView B must be below the threshold 0.5, since this node is not displayed in FIG. 7c. According to WorldView A, node 736 has instead a relatively high importance of 0.8.

A further embodiment foresees the option that a node indicates its multiple importance, veracities or relevancies that are associated with the multiple different WorldViews. For this, a special field or area of the node may indicate the currently selected WorldView parameter, similar to the field 320 or 325. When a user touches or hovers over this field, additional WorldViews are displayed along with the corresponding importance values or importance levels. For example, by selecting the WorldView indication of a node, a pop-up displays a list of the different WorldView parameters together with their respective importance values or stars symbols representing the importance level of that node. Alternatively, the information may be displayed within the areas 370 discussed in regard to FIG. 3b. A still further embodiment does not use a special field to display the different WorldView parameters and their related importance values. Instead, this information may be displayed upon a user selecting or hovering over the importance indication 320 or 325 in FIG. 3. In a still further embodiment, not only the different importance values for the currently considered node are displayed, but also the respective importance values for its downnodes and upnodes. One further option is to highlight the strongest path of arguments for a current centernode and to additionally highlight the respectively strongest path in the node map for the other WorldView, if different.

The strongest path in a discussion or node map can be displayed in order to identify the source of consent or the source of dissent of a currently considered node. Assuming a current centernode has a very strong opposing downnode. This implies that the importance of this downnode with an opposing argument has a high value with respect to the centernode. The high impact or importance of the opposing downnode can be caused by a high veracity of that downnode and by a high relevance of the opposing downnode to the centernode. The high veracity of the downnode in turn means that the downnode has itself opposing downnodes with very low importance and at least one supporting downnode with high relevance and high veracity (assuming those downnodes exist in the map). This situation of supporting downnodes with high impact and opposing downnodes with low impact must propagate through the node map, since the veracity of a node can be calculated as discussed above from the relevance and veracity values of its downnodes. By identifying always that downnode with a supporting argument having respectively the highest impact on its upnode, one can identify the strongest path through the node map that eventually leads to the source of dissent in the mentioned example.

Figure 8:
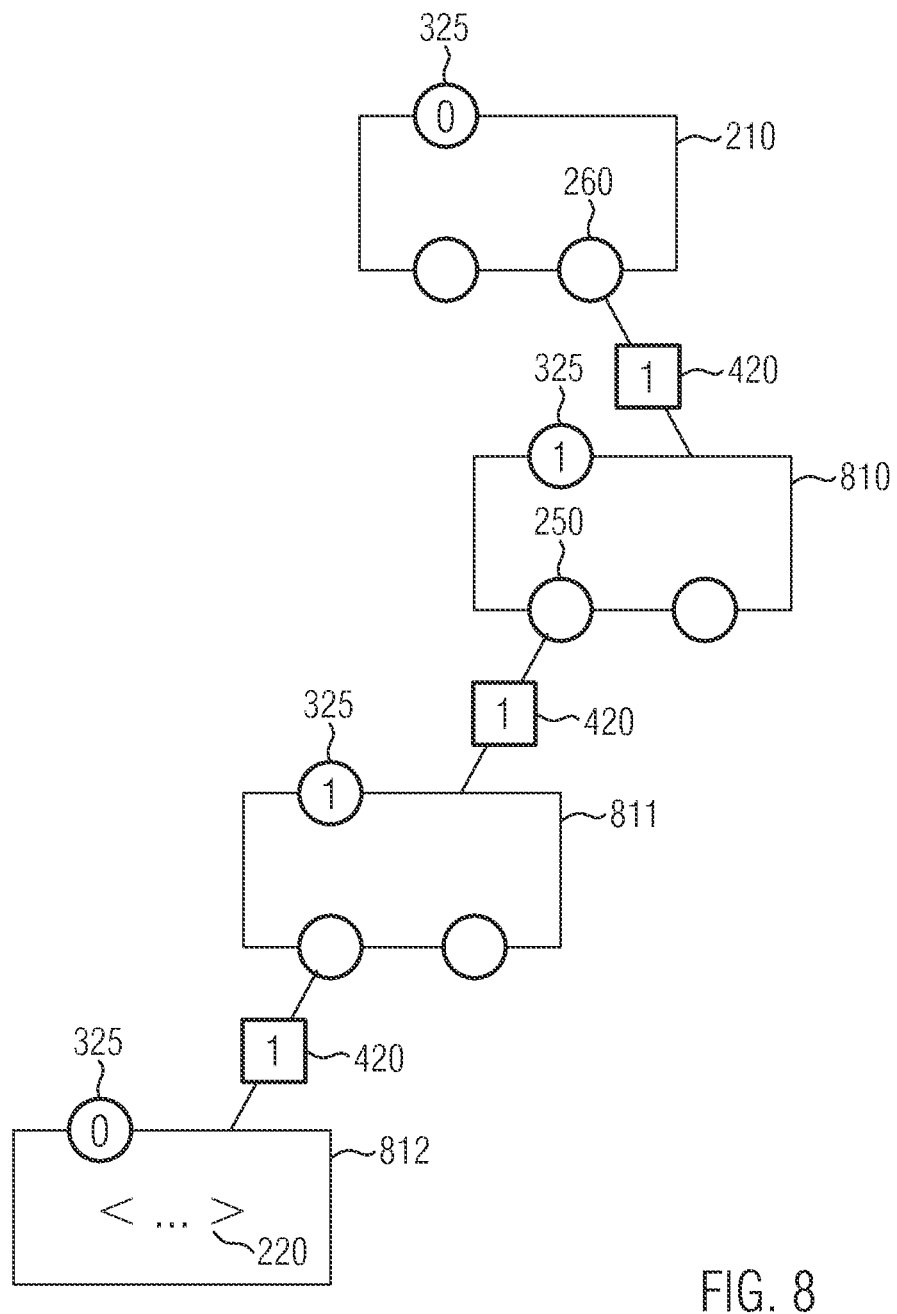
FIG. 8 illustrate a schematic representation of a strongest path in a node map according to embodiments of the present invention.

FIG. 8 illustrates this example for the strongest path of an exemplary centernode 210. In this example, it is assumed that the veracity and relevance value range between zero and 1 and that—according to an advanced view—both values are displayed as shown by reference numerals 325 and 420. In the example, the veracity of centernode 210 has the minimum value 0. This minimum value is a consequence of downnode 810 containing an opposing argument that is accordingly linked to port 260 of the centernode 210. Downnode 810 has a maximum veracity of 1 and a maximum relevance of 1 to centernode 210. This consequently leads to a minimum veracity for centernode 210. On the other hand, since node 810 has a maximum veracity of 1, it cannot have itself a downnode with an opposing argument having a high importance. Instead, node 810 has a supporting downnode 811 that again has a maximum veracity and maximum relevance. The same applies to node 811 that again has a downnode 812 with a supporting argument of maximum relevance and maximum veracity. In this extreme example, the strongest path leads to the node 812 as the source or initial cause of a minimal veracity of centernode 210 (i.e., the finding that node 210 has a false assertion). The example assumes that node 812 itself has no downnodes. By visualizing the strongest path as shown by FIG. 8, a user can identify the source of dissent for assertion 210 in order to understand why assertion 210 is not true at all. This also allows a user to add a node, for example, to node 812 with a new opposing argument, which would in turn change the veracity of node 812 (if it has non-zero importance). This decrease of importance will eventually be propagated through the node map up to centernode 210 using, for example, the equations discussed above. Alternatively, one can try to find and add opposing arguments to one or more of the assumed maximum relevancies 420 between the nodes 212 and 210, which would have a similar effect of reducing the veracity of node 810 and in turn increasing the veracity of centernode 210.

While the example of FIG. 8 shows the strongest path for a centernode having a minimum veracity, the strongest path can be shown for any veracity value. If the veracity values range between 0 and 1, the strongest path of a centernode with a veracity value of 0.5 and more should start with a downnode containing a supporting argument; otherwise the strongest path starts with an opposing downnode. The next downnodes in the strongest path are nodes with supporting arguments since otherwise the path would not be the strongest path.

Figure 9A:
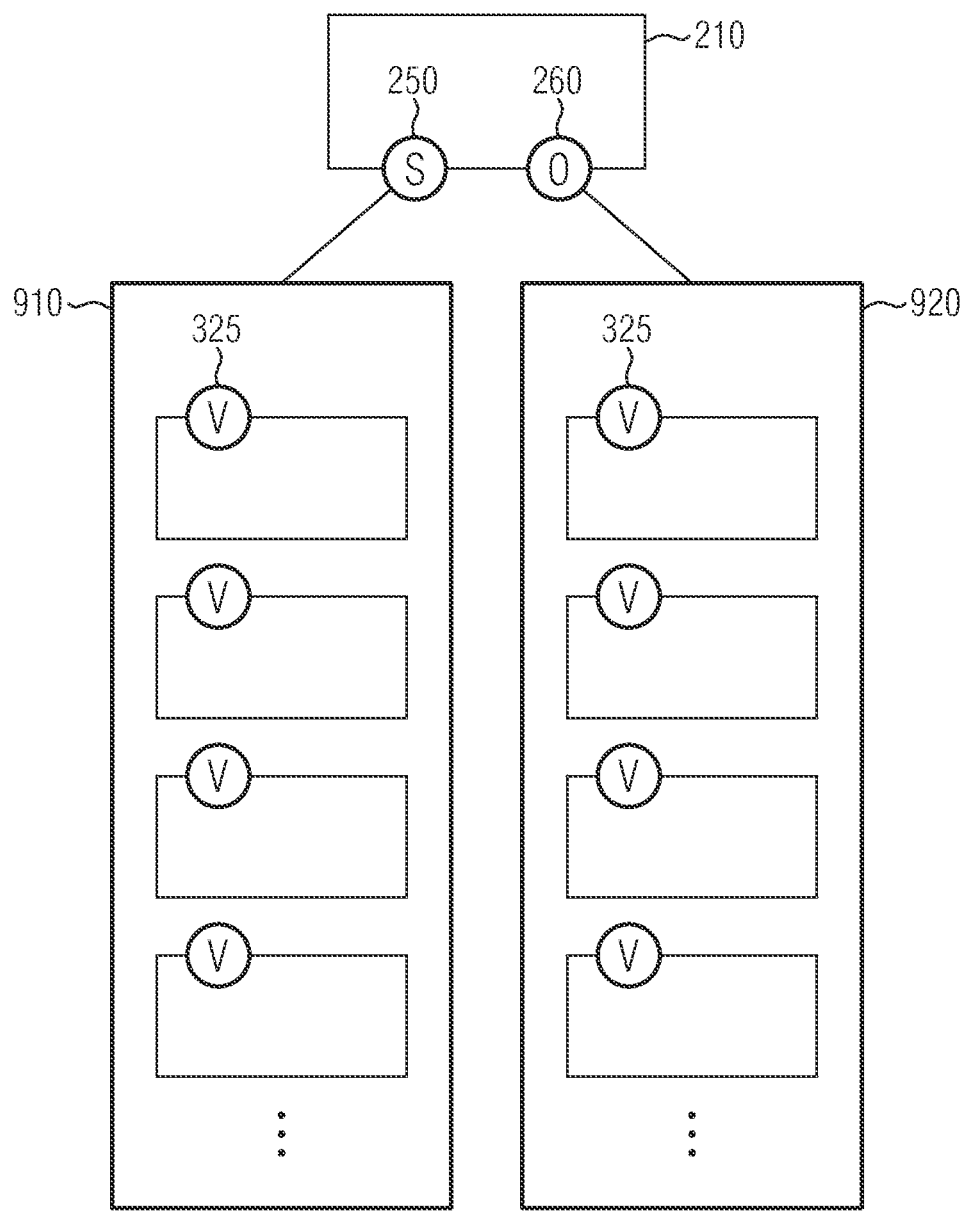
FIGS. 9a and 9b illustrates schematically a list view option according to embodiments of the present invention.
Figure 9B:
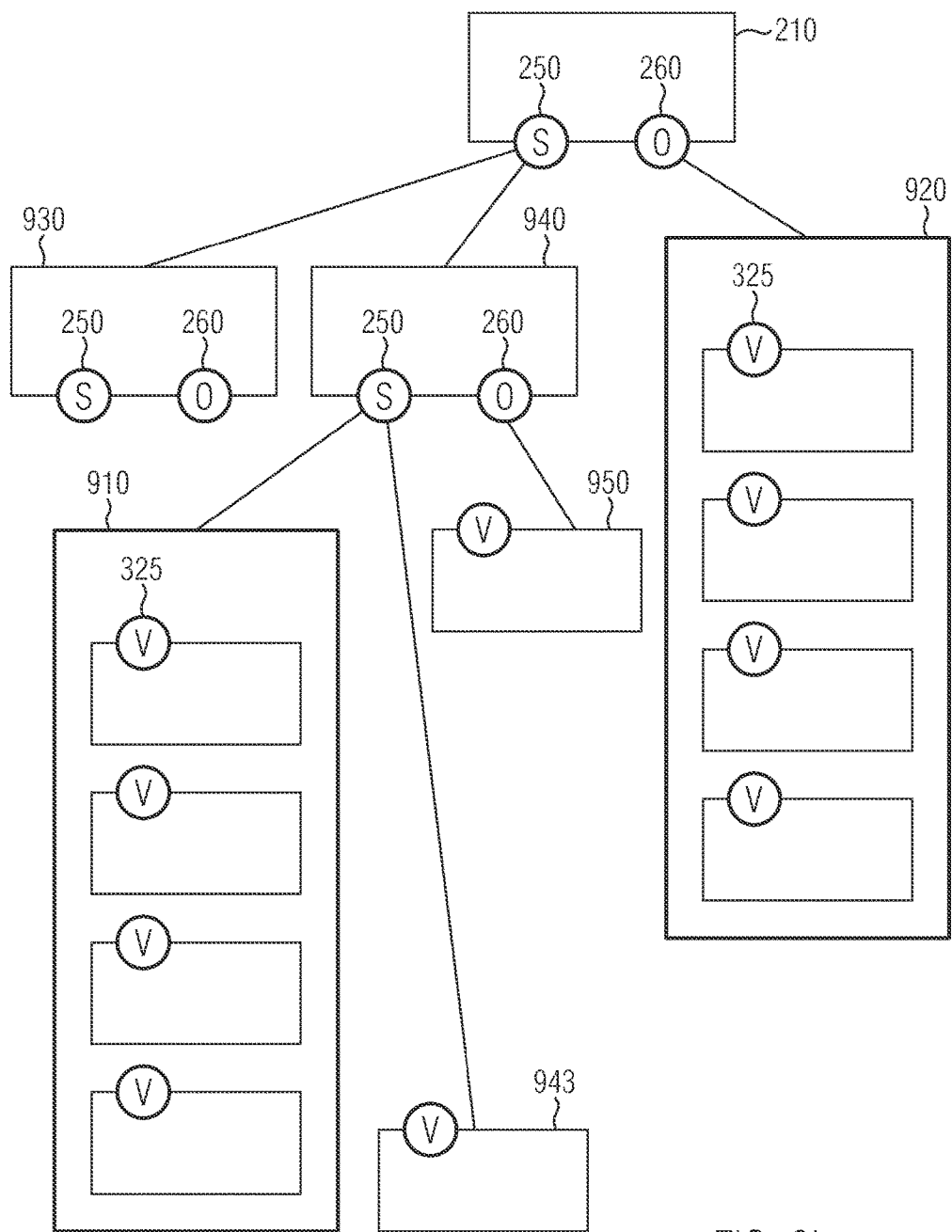

FIGS. 9a and 9b illustrates a list view option that can be used to display downnodes of a centernode 210. FIG. 9a shows an illustration of a centernode 210. Further details of node 210 may be shown as discussed above. However, instead of displaying the downnodes of centernode 210 in a tree structure, the downnodes of node 210 are displayed in an expandable list view, preferably in a designated area or separate window on the display screen. According to the list view, a first list 910 includes those nodes with a supporting argument and a second list 920 includes those nodes with an opposing argument to centernode 210. In a node tree structure view, the downnodes within list 910 would all be linked to port 250, while all opposing downnodes in list 920 would be linked to port 260. In list view example of FIG. 9a, only the lists 910 and 920 are linked to ports 250 and 260 of the centernode 210. The downnodes within the lists 910 and 920 may be ordered according to their importance to zero node 210, preferably starting with the node having the highest importance. In an advanced view, the lists 910 and 920 may each be split into two lists ordering the downnodes according to highest relevance and according to highest veracity values, respectively. The lists 910 and 920 may be expandable in that initially only a subset of nodes is displayed in lists 910 and 920 and a user can expand the lists in order to show more nodes. According to further embodiment, a user can click on or otherwise select one of the downnodes in lists 910 and 920 in order to cause the selected downnode to become the new centernode. In a further embodiment, the downnodes in lists 910 and 920 are minimized so that not all details of the nodes are displayed or merely a placeholder is displayed. Upon clicking on or selecting one of the minimized downnodes, additional details of the downnodes will be displayed or the downnode will be expanded.

FIG. 9b illustrates a further embodiment of the list view. In addition to a list of supporting and opposing downnodes 910 and 920 individual downnodes are separately displayed. In the example FIG. 9b, the opposing downnodes of centernode 210 are again shown in a list view 920, similar to FIG. 9a. In addition, two downnodes 930 and 940 of centernode 210 are shown without using a list view option. Likewise, an opposing downnode 950 of node 940 is shown without using the list view option. However, the downnodes 941 and 942 of node 940, both having a supporting argument, are shown using a list view 910. As noted above, selecting, clicking on or pulling one particular downnode within a displayed downnode list can extract the selected downnode from the list and instead individually display the selected downnode next to the list. For example, downnode 943 is separately displayed next to downnode list 910, even though list 910 and downnode 943 contain both supporting arguments for the same upnode 940. Downnode 943 can be (re-)inserted into list 910. Likewise, additional downnodes from list 910 can be extracted from the list and separately displayed in the same manner as downnode 943.

Figure 10:
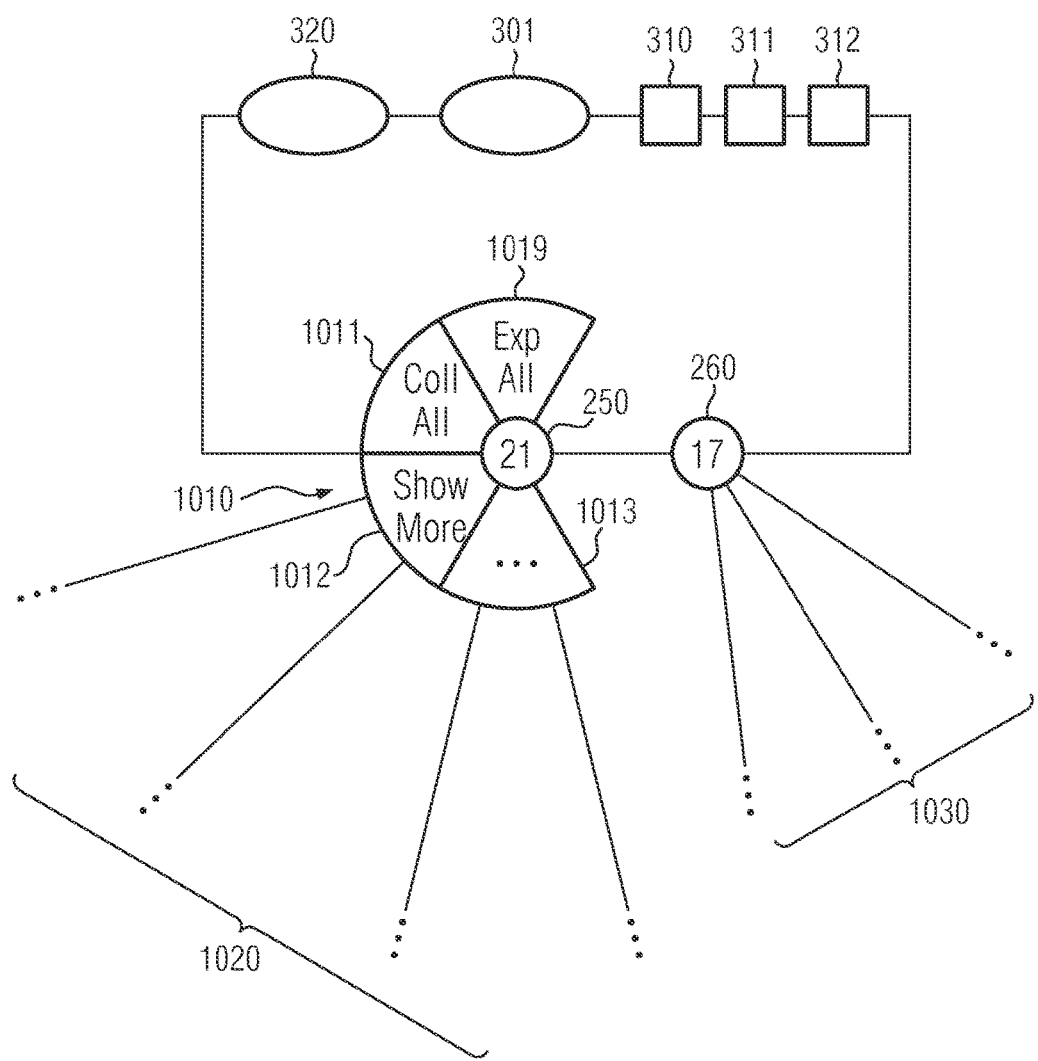
FIG. 10 illustrates an exemplary layout and exemplary details of a node representation as is can be used to display a node according to embodiments of the present invention.

FIG. 10 shows a further option for displaying a node concerning an embodiment for illustrating and managing downnodes of the node on a user display. The illustrated centernode 210 is assumed to have 21 downnodes with a supporting argument and 17 downnodes with an opposing argument. The total number of supporting and opposing downnodes is indicated within ports 250 and 260. In addition, ports 250 and 260 may have a different color further illustrating that one port relates to opposing arguments while the other port relates to supporting arguments. Upon clicking on or selecting the port, further selector fields 1010 are displayed. Port 260 shows the regular view of a port without having the additional selectors 1010 and port 250 while illustrates the additional selector fields. When the additional selector fields 1010 are displayed, again clicking on or touching port 250 reverts the port to the original view hiding the selector fields 1010. The selector fields 1010 can have different purposes and meanings. There meaning and purpose can be user selectable so that a user can personalize the appearance of nodes and maps. According to the example of FIG. 10, one selector field 1011 is used for expanding all downnodes linking to port 250. Another selector field 1111 collapses, minimizes, or hides all downnodes linked to port 250. A further field 1012 may be used for increasing the number of displayed or expanded downnodes linked to the port. Another corresponding field can be used to decrease the number of displayed downnodes (not shown). As illustrated by field 1013, additional fields may be added, for example, allowing a user to set or change a threshold value specifying how many downnodes are displayed, such as a total number of displayed downnodes or a threshold for importance veracity and/or relevance values of downnodes to be displayed. Likewise, special selector fields may be included within selector fields 1010 providing the same purpose as the various fields shown by FIGS. 3a to 3d, or allowing to switch between different views like an advanced view, basic view, or a node list view.

Figure 11:
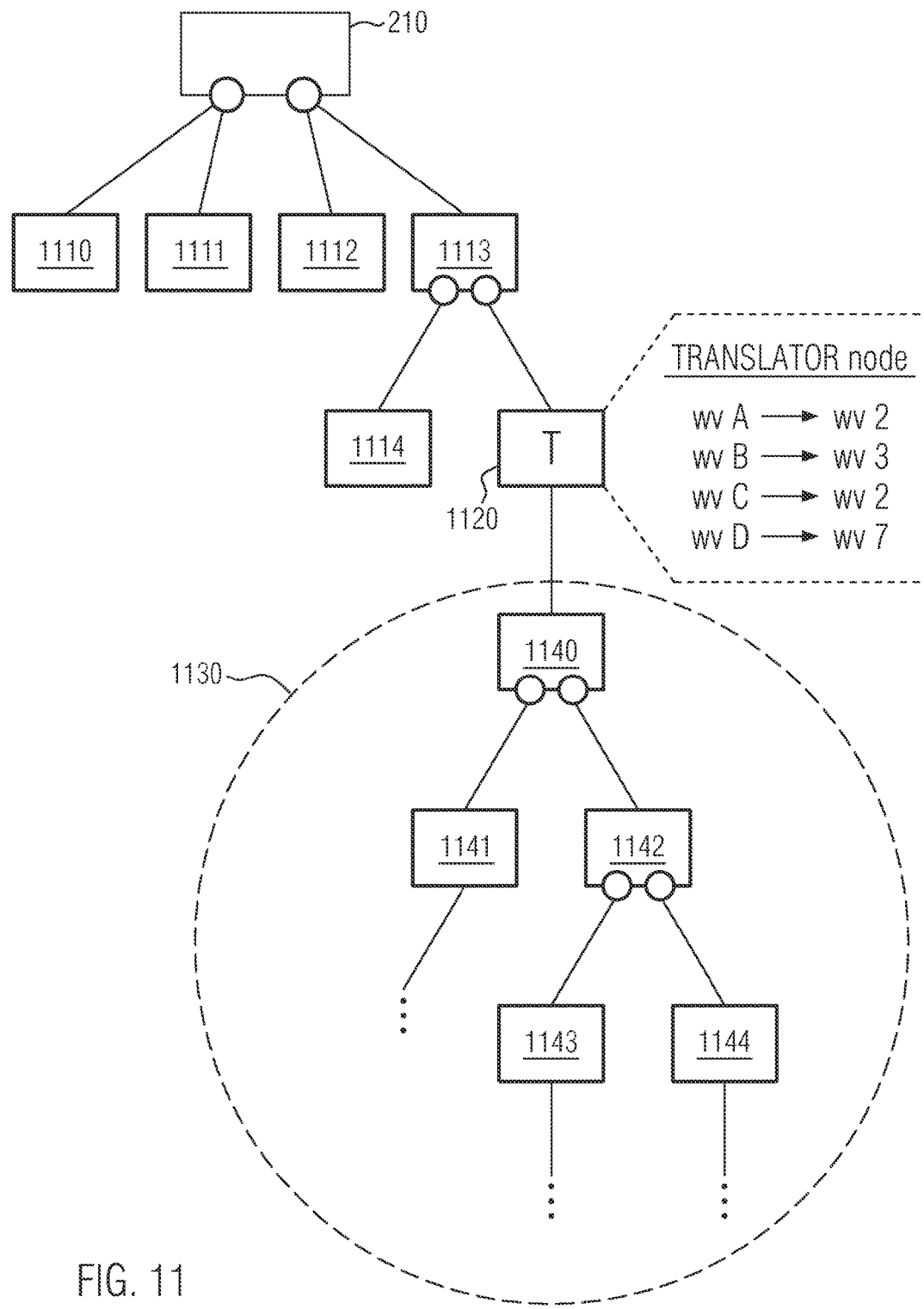
FIG. 11 illustrates schematically a translator node option according to embodiments of the present invention.

FIG. 11 illustrates the concept of a translator node according to an embodiment of the invention. A translator node 1120 is a special node in a node map that can be used to translate or map a WorldView into another WorldView. As discussed herein, single nodes, branches of lined nodes or entire maps can be copied. For example, a node (and its downnodes) may be copied and added as a new downnode of another node. The copying of nodes can be done across different maps. The importance, veracity and relevance values assigned to each node and its links can vary depending on the WorldView parameter. This can cause a situation that a node to be copied and the node to which the copied node is to be linked have different WorldViews. However, the same WorldView is needed to compute the veracity and relevance values of a node based on its downnode. FIG. 11 shows an exemplary centernode 210 and its downnodes 1110 to 1113, of which node 1113 has itself one supporting downnode 1114. When a user identifies an argument in a node map and wants to add this argument as an opposing argument to node 1113, he can copy the respective node of containing the argument and link it to port 260 of node 1113. If the identified argument is, however, in another node map that uses different WorldView parameters than the current node map or centernode 210, the node cannot be simply copied. In such a situation, a translator node 1120 can be used to connect the copied node 1140 and the node 1113 to which the copied is to be linked as an opposing node in the given example. The translator node provides for a mapping of the WorldView parameters of the copied node 1140 and all its downnodes and branches 1141 to 1144 to the WorldView parameters used for node 1113. In FIG. 11, dashed line 1130 denotes the domain of the node map from which node 1140 is copied and in which WorldView parameters A, B, C and D are valid. Centernode 210 and its downnodes 1110 to 1114 belong to a node map in which WorldView parameters 2, 3, and 7 (and possible more) are valid.

The mapping can be set by a user. For this, the user can be prompted to specify a mapping rule for all WorldView parameters of the node to be copied, i.e. node 1140. In another embodiment, the user is only prompted to specify a mapping rule for all those WorldViews of node 1140 that have no corresponding WorldView parameter for its new upnode 1113. In other words, if node 1140 and node 1113 both have a WorldView parameter "scientist view", it is assumed that they denote the same and no mapping rule is required. However, the user may nonetheless specify a mapping rule, which is required if WorldView parameter "scientist view" has a different meaning within the current node map of node 1113 and within 1130. One or more suggestions could be offered for a user to select from in order to specify a mapping rule. If a copied node has a WorldView parameter "Joe's view" that does not exist within the current node map, a list of all existing WorldView parameters valid within the current node map could be displayed so that the user can select one. Assuming the user has selected a WorldView "company policy", the translator node 1120 will map or translate the initial WorldView parameter "Joe's view" of copied node 1140 and its downnodes within domain 1130 into WorldView "company policy". Thus, when computing the veracity of node 1113 for its WorldView parameter "company view", the respective veracity/relevance values of downnode 1114 for WorldView parameter "company view" and the respective veracity/relevance values of downnode 1140 for WorldView parameter "company view" can be used as required for the equations and algorithm discussed above.

The described option for prompting a user to specify a mapping rule for WorldView parameters of copied node 1140, however, does not guarantee that all WorldViews of node 1113 have a correspondence for the copied node 1140 and its downnodes. As an alternative or additionally, the user may thus be prompted to specify, for all those WorldView parameters of node 1113 that do not (yet) exist for node 1140, either a mapping to an existing WorldView parameter within domain 1130 or to newly define respective veracity/relevance or importance values for the copied node 1140 and its copied downnodes 1141 to 1144 that are applicable for these WorldView parameters. In other words, a user may be prompted to add new WorldView parameter and its respective veracity/relevance or importance values for the copied nodes. Such a prompting can be done when copying and linking node 1140 to node 1113 (via translator node 1120). However, only a notification or warning could be presented to the user that the copied node(s) do not specify one or more WorldView parameters of new upnode 1113, so that the user can decide whether or not to add/map those WorldView parameters. Another prompt to the user to add or specify a mapping for those WorldView parameter(s) of node 1140 and its downnodes may be displayed when those WorldView parameter(s) of node 1140 are actually needed. In other words, if the user adds new copied downnode 1140 while currently using/displaying only a WorldView parameter "A" that does exist within 1130, the user may not need to add other WorldViews to the copied node 1140 that do not exist within 1130 but for node 1113. Only if the user switches the WorldView to another WorldView parameter, using for example field 710 of FIG. 7, that does not exist for node 1140, the user may be prompted to add or specify a mapping for the unspecified another WorldView parameter within 1130. Otherwise, an error message can be displayed that the selected WorldView parameter does not exist for nodes 1140 to 1144.

According to a further embodiment, not only veracity, relevance and importance values but also the content, the argument, of a node may be different for different WorldView parameters. In this case, the mapping of the translator node would also translate the difference in the node's assertion.

Figure 12:
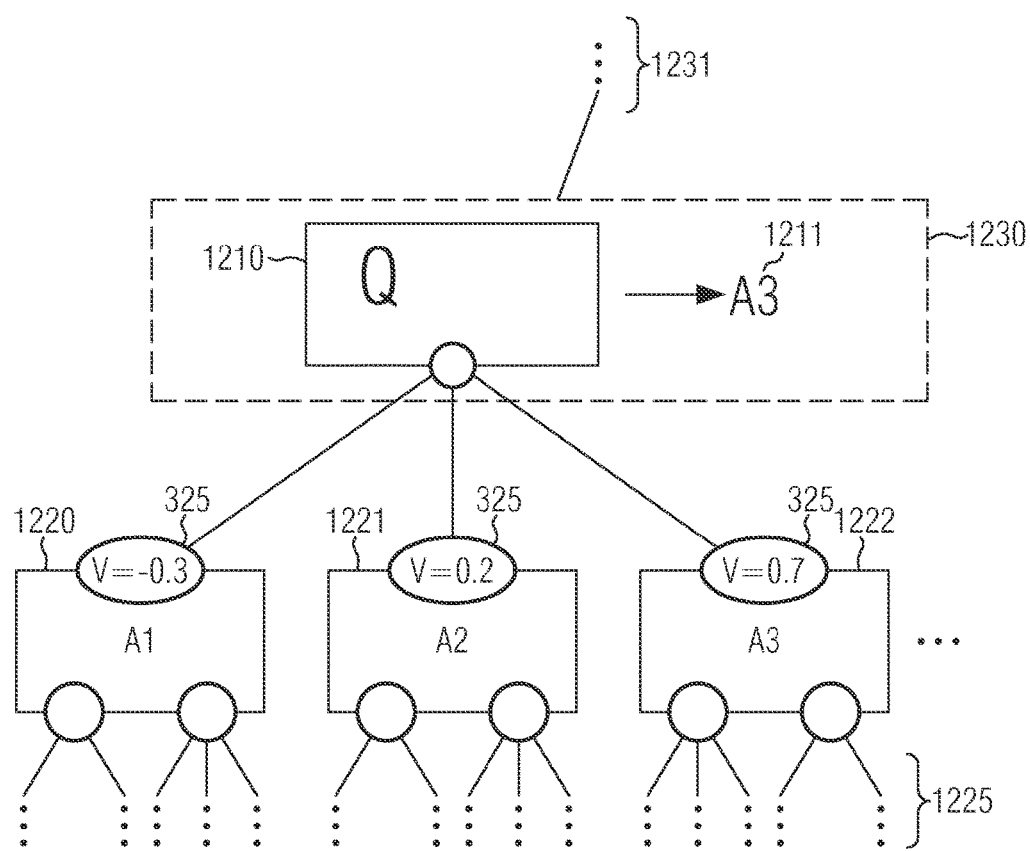
FIG. 12 illustrates schematically an evaluation node option according to embodiments of the present invention.

FIG. 12 shows another functional node referred to as an evaluator node according to an embodiment of the invention. The evaluator node 1230 provides the assertion 1211 of its downnode with the highest veracity value 325. This assumes that no relevance values are assigned to the links between evaluator node 1230 and its downnodes 1220 to 1222. If relevance values are assigned to these links, the output of the evaluator node, i.e. the assertion A3 (1211), is the assertion of that downnode with the highest importance value. The evaluator node can this be used to generate an output to a question 1210 in that the answer will be the assertion with the highest veracity or importance. The downnodes 1220 to 1222 of evaluator node 1230 are regular nodes that have themselves downnodes as indicated by 1225. As such, their veracity values depend on their downnodes and can very over time, for example when new downnodes with new arguments are added that change the veracity of their upnodes. The evaluator node therefore shows how arguments change the answer to question 1210 and whether the answer is different for different WorldViews. The evaluator node 1130 may itself be added as a "regular" node to another upnode, as indicated by 1231. In this case, the assertion of that node is that the answer to question 1210 is the output 1211. As such, the assertion of the node is dynamic in that it depends on the veracity and importance of node 1230's downnodes. The veracity of evaluator node 1230, if linked as a downnode to another node, is preferably set to the highest veracity value of the node 1230's downnodes 1220 to 1222.

Figure 13A:
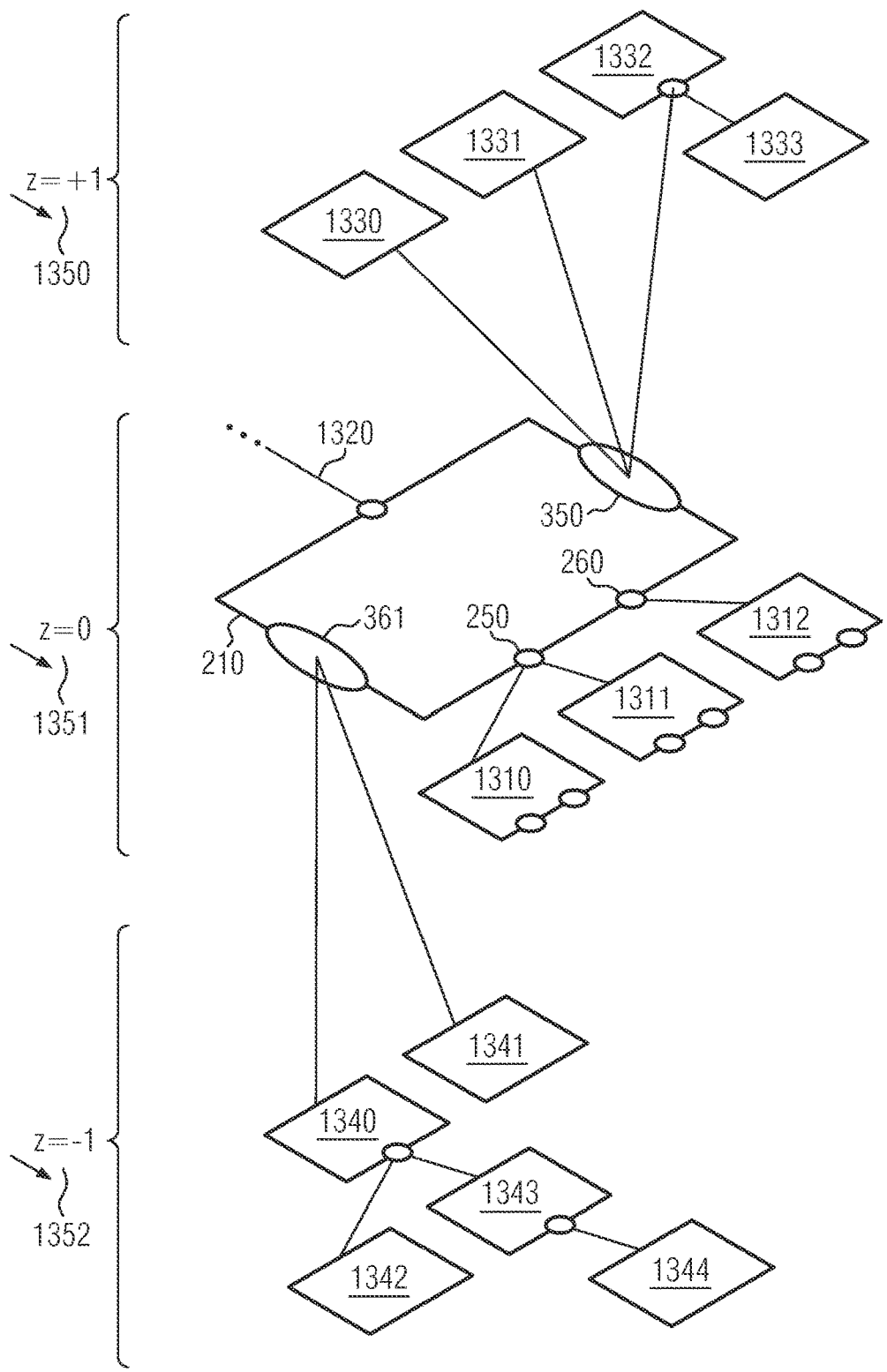
FIGS. 13a and 13b illustrate schematically a three-dimensional view option according to embodiments of the present invention.
Figure 13B:
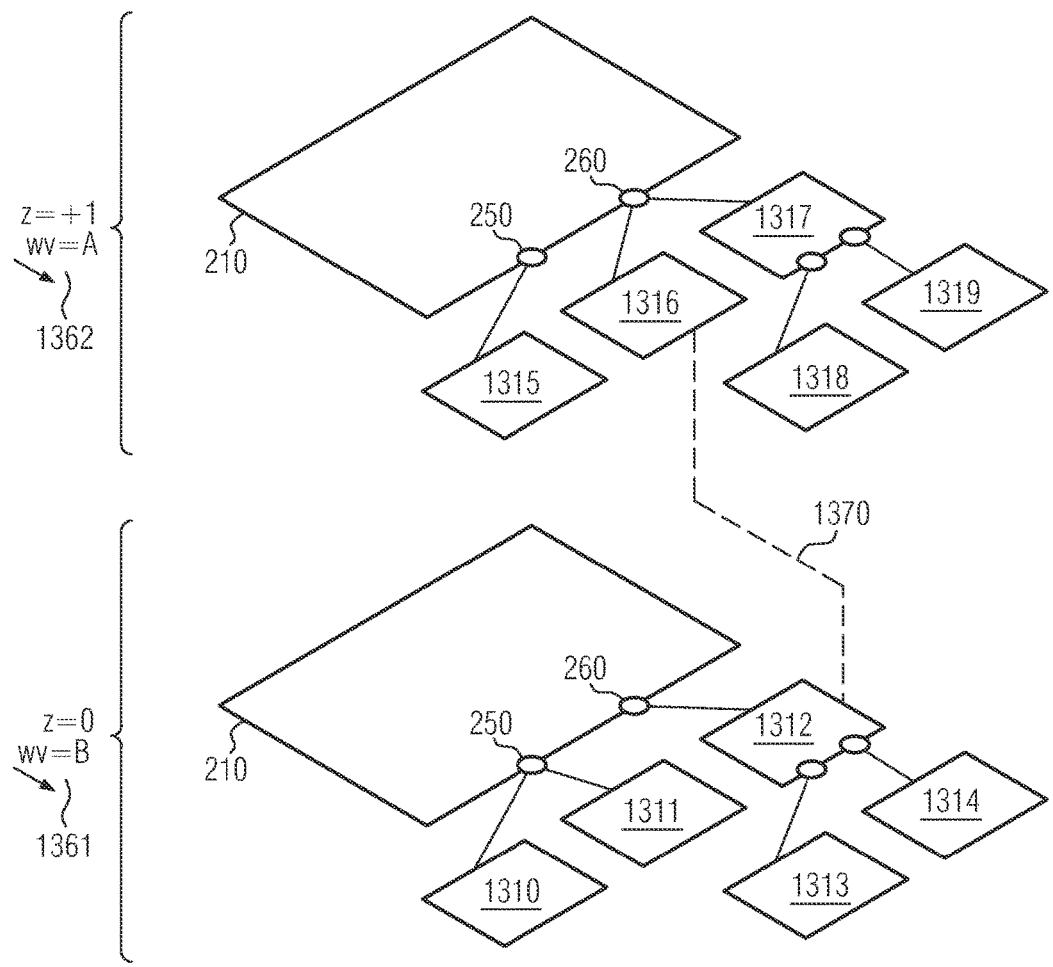

FIGS. 13*a* and 13*b* show exemplary illustrations of a three-dimensional view option according to further embodiments of the invention. Shown is a centernode 210 with exemplary fields and ports 250, 260, 350, 361. However, additional or different fields and ports as discussed herein above can be displayed for node 210. The downnodes 1310 to 1312 of node 210 are linked to connector ports 250 and 260. All nodes of the map that are displayed in one plane of the three-dimensional view. The downnodes can be located in the plane such that they appear closer to the viewer than their upnode. The plane of the nodes can be further indicated by an arrow and/or textual indication such as "z=0", even though this is optional. While all nodes of the node map are within plane 1351, comments or chat messages that can optionally be added to nodes may be displayed in different planes. In the example of FIG. 13*a*, all comments are shown in plane 1350, denoted exemplary with "z=+1", while all chat messages are includes in plane 1352, denoted exemplary with "z=−1". The chat messages 1340 to 1344 and the comments 1330 to 1333 may themselves be presented in a tree structure reflecting, for example that comment 1333 was added in reply to comment 1332. The comments and the chat messages can be linked to the respective comment port 350 and chat port 361, which can be illustrated via lines between the ports of a node and comments and chat messages.

The three-dimensional view may also be used to visualize different WorldViews of a node map in that the nodes of the node map are displayed in one plane 1362 according to a first WorldView parameter, such as "A" and again in another plane 1361 according to another WorldView parameter, such as "B". As discussed herein above, different WorldViews may cause different nodes of a node map to be displayed due to different veracity, relevance and/or importance values. In order to more easily recognize the differences of a node map for different WorldView parameters, the same node appearing in two planes may be connected by a line 1370. It is further possible to highlight the strongest path in each plane, or to highlight those nodes in each plane that have significant changes in their veracity, relevance or importance values for both WorldView parameters. Another option is to use the three-dimensional view to illustrate a historical development of a map or discussion in that different z planes show the nodes according to different points in time, meaning at different stages of developing the map by adding and/or changes the nodes.

Figure 14:
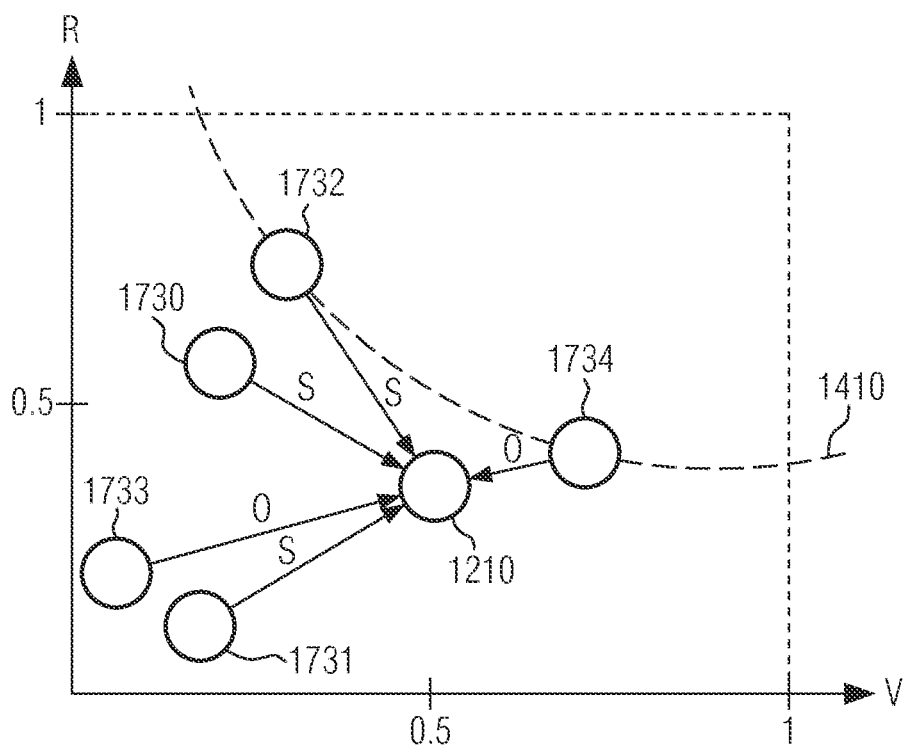
FIG. 14 illustrates schematically a diagram view of a node map or node branch according to embodiments of the present invention.

FIG. 14 illustrates a diagram view of a node map or node branch according to a still further embodiment of the invention. The diagram view shows nodes in a two-dimensional area according to their veracity value (x-coordinate; abscissa) and their relevance value to its upnode (y-coordinate; ordinate). Both axes may also be switched. As discussed above, the importance or impact of a node is based on a mathematical product of veracity and relevance value. The example of FIG. 14 assumes that the values range between 0 and 1. Different ranges are possible in which case the minimum and maximum values on the x- and y-coordinates would change accordingly. The example of FIG. 14 shows the diagram view of centernode 210 and its downnodes 730 to 734 as shown in FIG. 7*a*. The centernode 210 is shown in the diagram of FIG. 14 as node 1210. Centernode 210 has an importance value of 0.55, which is the result of a veracity value and a relevance value as used as the x and y coordinates in the diagram of FIG. 14. Likewise, downnodes 730 to 734, having importance values of 0.6, 0.3, 0.7, 0.2 and 0.7, respectively, are shown in the diagram view as nodes 1730 to 1734, respectively.

The arrows between nodes 1730 to 1734 and centernode 1210 visualize that nodes 1730 to 1734 are each downnodes of upnode 1210. In addition, the diagram view may visualize whether a node is supporting or an opposing downnode. This is done by the symbols "S" and "O" next to the arrows. Different symbols or text can be used instead. Alternatively or additionally, the arrows and/or the downnodes may have different colors or shapes to visualize whether they are opposing or supporting nodes. The diagram view shows in a comprehensive manner their relevance and veracity values. The diagram view further shows the importance or impact of a node to its upnode 1210. The nodes with the highest importance are those nodes closest to the top most, right most location in the diagram, irrespective of the location of the centernode 1210. In the example of FIG. 14, the nodes 1732 and 1734 have the highest impact on centernode 1210. Actually both have the same impact value 0.7 (as indicated in FIG. 7*a*) and derivable from their x- and y-coordinates in the diagram. The line 1410 shows an iso-impact line with the same importance/impact value for centernode 1210. Such iso-impact lines can be drawn in the diagram as circles or ellipses, depending on the actual formula used to compute the impact/importance value from the veracity and relevance values. The diagram view provides for an easy comparison and identification of strong and weak arguments for centernode 1210. The diagram view may be selected and activated for any node such that the selected node and its downnodes are converted into the diagram view.

Figure 15:
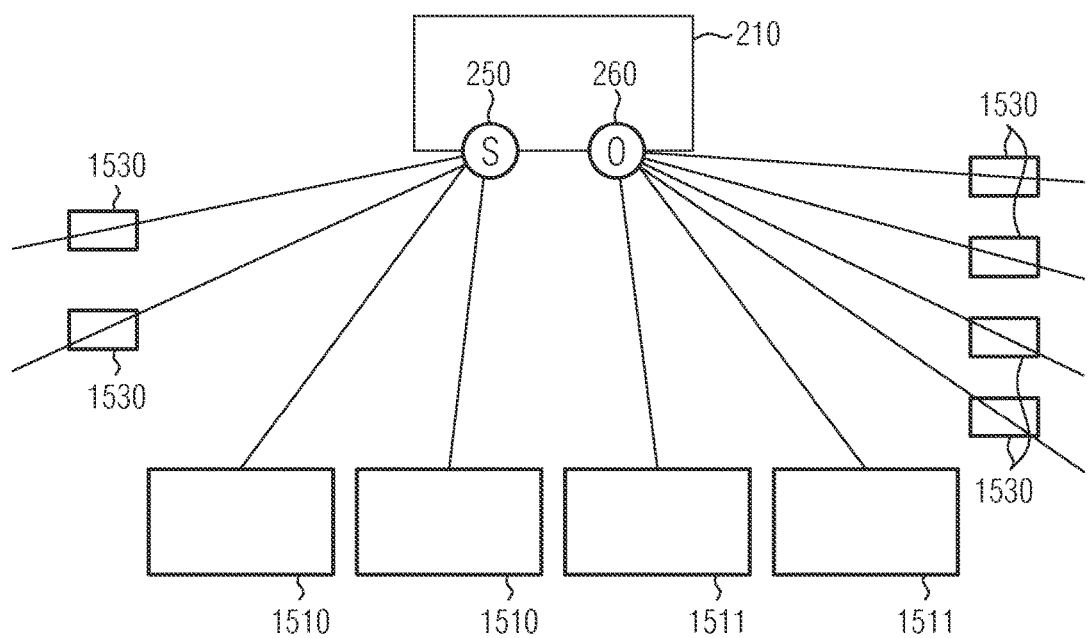
FIG. 15 illustrates schematically a nodes view option according to embodiments of the present invention.

FIG. 15 shows a detail of a regular node view according to an embodiment of the invention. Illustrated is an exemplary centernode 210 and four of its downnodes of which two are supporting downnodes 1510 linked to port 250 of centernode 210 and two are opposing downnodes linked to port 260 of centernode 210. However, more downnodes of a (zero)node may need to be displayed than place is available on the user display for displaying same. In this case, according to an embodiment of the invention, only those downnodes are displayed for which the display space is sufficient, i.e. nodes 1510 and 1511, while for all other downnodes only the links are displayed that branch off the ports 250 or 260 and extend towards to edges of the display screen area available or used for displaying the node map. Upon hovering over such a link, or otherwise selecting a link such as clicking it, the downnode that corresponds to the link is then displayed. This may be done by overlaying the node on the displayed node map section of FIG. 15, by zooming the view to the respective downnode, or by automatically scrolling the current node map section along the selected link until the respective downnode is visible. In addition, a placeholder symbol 1530 may be placed on or in close proximity to the link symbolizing a downnode(s) that is not shown in the current view but belongs to the current node map or branch. The link and the placeholder symbol may also denote a branch of multiple nodes instead of a single downnode. In this case, the entire branch may be displayed or the displayed section of the node map may "travel" along the link until the branch is visible. Likewise, if a user scrolls the displayed node map view towards the display area or display screen boarder and space is available to display further downnodes, the available space may be filled by automatically expanding and displaying downnodes previously not expanded.

While the invention has been described with respect to the physical embodiments constructed in accordance herewith, it will be apparent to those skilled in the art that various modification, variation and improvements of the present invention may be made in the light of the above teachings and within the purview of the appended claims without departing from the spirit and intended scope of the invention. Accordingly, it is to be understood that the invention is not limited by the specific illustrative embodiments, but only by the scope of the appended claims.

The invention claimed is:

1. A system for evaluating a plurality of statements transmitted amongst a plurality of geographically-distributed users interactively participating in a topic of an online discussion, the system comprising:
    a first user device operated by a first user of the geographically distributed users configured for:
        generating for display, a graphical representation of the plurality of statements according to a tree-like structure;
        receiving a statement from the first user for inclusion into the tree-like structure, wherein each statement in the plurality of statements comprises:
        a contents portion,
        an assigned classification, wherein the assigned classification is selected from a set of at least two classifications, each classification of said set of at least two classifications specifies a relationship of an associated statement to another statement in said tree-like structure, the set of at least two classifications including a supporting assertion and an opposing assertion, and
        one or more associated quality designations, wherein the one or more associated quality designations include an impact value based on a veracity value and a relevance value of each statement,
        wherein at least one of said plurality of statements includes (i) at least a first veracity value and a second veracity value and (ii) at least a first relevance value and a second relevance value, the first veracity value and the first relevance value associated with a first contextual parameter, and the second veracity value and the second relevance value associated with a second contextual parameter,
        wherein the display of the tree-like structure to the first user includes generation of a user perspective driven layout based on the first contextual parameter and the second contextual parameter;
    a second user device operated by a second user of the geographically-distributed users configured for:
        displaying the tree-like structure including the statement of the first user;
        receiving from the second user, a voting value representative of approval of the second user to the statement of the first user; and
    a collaboration system configured for:
        generating the display of the tree-like structure to the first user and the second user; and
        modifying the voting value of the second user based on one or more criteria.

2. The system according to claim 1, further comprising: aggregating a plurality of quality designations into a single quality designation of one of said statements.

3. The system according to claim 1, wherein the assigned classification of a first statement specifies the relationship of said first statement to a second statement, said second statement being directly linked to said first statement and being positioned in said tree-like structure above said first statement, said system further comprising:
propagating at least one quality designation of said first statement to said second statement; and
adjusting or weighting at least one quality designation of said second statement based on the propagated at least one quality designation of said first statement and the assigned classification of said first statement to said second statement.

4. The system according to claim 3, wherein each of said statements that is not a root statement of the tree-like structure is linked to one or more statements, and wherein all statements positioned in said tree-like structure below a statement form a subjacent tree-like structure with said statement being the root statement of said subjacent tree-like structure, and wherein
if a statement is directly linked to more than one other statements in the tree-like structure, the subjacent tree-like structure of said statement is either identical for all of said more than one other statements, or statements of said subjacent tree-like structure have separate classification designations and/or separate quality designations for different statements of said more than one other statements, respectively.

5. The system according to claim 1, wherein the assigned classification of a first statement specifies the relationship of said first statement to a second statement, said second statement being directly linked to said first statement and being positioned in said tree-like structure above said first statement, said first statement having one or more associated quality designations, said second statement having one or more associated quality designations, said system further comprising:
propagating at least one quality designation of said first statement to said second statement;
computing a quality designation for said second statement at least partially based on said propagated at least one quality designation of said first statement; and
highlighting a conflict arising between the computed quality designation for said second statement and a respective quality designation that is associated with said second statement.

6. The system according to claim 1, further comprising:
filtering the visibility of individual statements or subjacent tree-like structures in the graphical representation on the one or more displays based on the respective quality designations and/or assigned classifications, wherein a subjacent tree-like structure is formed by all statements positioned in said tree-like structure below a statement forming the root statement of said subjacent tree-like structure.

7. The system according to claim 1, wherein the quality designations and/or assigned classifications of statements of said tree-like structure are separately stored for different users or for different points-of-views, allowing the geographically-distributed users to use only one of the separately stored quality designations and/or assigned classifications.

8. The system according to claim 1, wherein a user of the geographically-distributed users is classified into user levels, said user levels determining the ability of said users to create, edit, delete or link statements and quality designations,
wherein the user level of the user is increased by positive voting values of other users or own voting values closely matching the voting values of different users.

9. The system according to claim 1, further comprising:
allowing a user of the geographically-distributed users to perform actions on statements, said actions comprise one or more of creating, editing, deleting, linking or voting on statements,
wherein a number of the actions the user is allowed to perform is limited, the limitation being based on a given time duration, a predefined or a variable number of actions that can be performed, and
if the number of actions is limited according to a variable number of actions, a cost being assigned to each performed action reducing the variable number once the action has been performed, said variable number being increased by a specific amount or to a preset maximum value after expiration of a given time period, wherein said variable maximum value is adjustable based on a total number of the geographically-distributed users and the number of overall actions performed within a given timeframe.

10. The system according to claim 1, further comprising:
notifying a user of the geographically-distributed users about at least one of changes to the tree-like structure and changes to the graphical representation.

11. The system according to claim 1, further comprising:
recording changes to the tree-like structure or the graphical representation; and
replaying a development of at least a portion of said tree-like structure.

12. The system according to claim 1, wherein the tree-like structure and the statements are maintained in a public space accessible by the geographically-distributed users, said system further comprising:
copying or moving, by a user of the geographically-distributed users, one or more statements and any of their subjacent tree-like structures into private user space of the user, wherein a subjacent tree-like structure is formed by all statements positioned in said tree-like structure below a statement forming the root statement of said subjacent tree-like structure,
modifying said one or more statements and subjacent tree-like structures by the user in the private user space of the user; and
copying or moving, by the user, the modified one or more statements and subjacent tree-like structures back into the public space,
wherein said user's private user space is accessible by said user or is shared by a group of users comprising said user.

13. The system according to claim 1, further comprising optimizing said graphical representation, said optimizing comprises one or more of:
hiding a statement if an associated quality designation is below a given threshold, wherein said quality designations range between a minimum and a maximum quality designation;
hiding a statement and its subjacent tree-like structure if an associated quality designation is below a given threshold, wherein said quality designations range between a minimum and a maximum quality designation, and wherein all statements positioned in said tree-like structure below said statement form its subjacent tree-like structure with said statement being the root statement of its subjacent tree-like structure;
displaying the complete subjacent tree-like structure of only one or some of said statements while hiding the subjacent tree-like structure of other statements, said one or some statements being statements currently selected by a user of the geographically-distributed users, or currently centered on the graphical representation or having a high quality designation from among said statements of said tree-like structure, wherein all statements positioned in the tree-like structure below the statement form its subjacent tree-like structure with the statement being the root statement of its subjacent tree-like structure;

highlighting, in said graphical representation on the one or more displays, statements or an area of the tree-like structure of high user activity where relatively many new statements were created, edited or linked, wherein the highlighting corresponds to most voting values or most controversial voting values added in a given time duration;

highlighting, in said graphical representation or itemizing on the one or more displays, statements in a subjacent tree-like structure of the user-selected statement having or exceeding a given quality designation threshold, wherein said quality designation ranges between a minimum and a maximum quality designation;

highlighting in said graphical representation on the one or more displays, statements that have been edited, created, linked or deleted since the user last used or viewed said graphical representation.

14. The system according to claim 1, wherein said graphical representation is accessible or visible by said geographically-distributed users, said system further comprising:

creating a new statement by a user of the geographically-distributed users; and releasing said new statement to said graphical representation in order to become accessible or visible by said geographically-distributed users.

15. The system according to claim 14, wherein one or more alternative statements can be created by said user, and said releasing comprises determining which of said alternative statements is released to become accessible or visible by said geographically-distributed users based on voting values on said alternative statements by one or more other users.

16. The system according to claim 1, wherein the graphical representation is presented on a user interface, the user interface comprised in a mobile device, a tablet computer, a smartphone, or a user terminal.

17. The system according to claim 16, the user interface provided by an application software, app, running on the smartphone, the tablet computer, or the mobile device.

18. The system according to claim 1, further comprising:

applying policies to each of said statements, the policies based on said quality designations from said geographically-distributed users and representative of user-specific perspectives of each of said geographically-distributed users.

* * * * *